(12) United States Patent
Skolicki et al.

(10) Patent No.: US 9,015,163 B1
(45) Date of Patent: Apr. 21, 2015

(54) USING CROSS-MATCHING BETWEEN USERS AND MATCHING AGAINST REFERENCE DATA TO FACILITATE CONTENT IDENTIFICATION

(71) Applicant: Google Inc., Mountain View, CA (US)

(72) Inventors: Zbigniew Skolicki, Kraków (PL); Jurek Foryciarz, Kraków (PL); Jan Wicijowski, Kraków (PL); Grzegorz Glowaty, Kraków (PL)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 13/798,571

(22) Filed: Mar. 13, 2013

(51) Int. Cl.
*G06F 17/30* (2006.01)

(52) U.S. Cl.
CPC .................................. *G06F 17/30495* (2013.01)

(58) Field of Classification Search
None
See application file for complete search history.

(56) References Cited

U.S. PATENT DOCUMENTS

| | | | |
|---|---|---|---|
| 2010/0332210 A1* | 12/2010 | Birdwell et al. | 703/22 |
| 2011/0035382 A1* | 2/2011 | Bauer et al. | 707/741 |
| 2013/0198215 A1* | 8/2013 | Lee et al. | 707/758 |
| 2014/0244641 A1* | 8/2014 | Patterson | 707/737 |

OTHER PUBLICATIONS

"FlipFactory: Using YouTube Fingerprinting with FlipFactory," Jan. 2010, 16 pages, Telestream, Inc.
"Digital Fingerprinting & Video Content Recognition: Enabling New Forms of Interactive Advertising," White Paper, Jun. 7, 2011, 9 pages, Audible Magic Corporation.
Milano, D., "Content Control: Digital Watermarking and Fingerprinting," White Paper, 11 pages, Rhozet, A Business Unit of Harmonic, Inc., Last accessed Mar. 27, 2013, http://www.rhozet.com/whitepapers/Fingerprinting_Watermarking.pdf.
Mediahedge, "Digital Fingerprinting," White Paper, 2010, 12 pages.

* cited by examiner

*Primary Examiner* — Wilson Lee
(74) *Attorney, Agent, or Firm* — Byrne Poh LLP

(57) ABSTRACT

Techniques for identifying video and/or audio content are presented. An identification management component (IMC) groups users determined to be at least potentially be watching the same content based on first content fingerprints associated with respective content viewed by the users on communication devices, and a defined matching criterion. IMC facilitates identifying the content associated with the group of users based on first content fingerprints associated with the group of users and first reference content fingerprints. IMC receives a second content fingerprint associated with a communication device of a user in the group, sends the second content fingerprint to a third-party identification component for comparison with second reference content fingerprints, and receives content identification information in response. IMC identifies the content for the group of users based on the content identification information and/or the content identification made based on the first content fingerprints associated with the group.

21 Claims, 8 Drawing Sheets

US 9,015,163 B1

USING CROSS-MATCHING BETWEEN USERS AND MATCHING AGAINST REFERENCE DATA TO FACILITATE CONTENT IDENTIFICATION

TECHNICAL FIELD

This disclosure relates generally to identification of content, and more specifically to using cross-matching between users and matching against reference data to facilitate content identification.

BACKGROUND

Communication devices (e.g., computers, mobile phones, electronic tablets, etc.) can be used to perceive (e.g., view, listen to) content, such as video or audio content. The video or audio content can be obtained from, for example, a communication device itself, or from another communication device connected via a communication network to the communication device. Communication devices that can be used to present content can include, for example, a computer, a mobile phone, a television, an Internet protocol (IP) television (IPTV), a set-top box, a content-streaming device, an electronic tablet, an electronic pad, an electronic notebook, an electronic reader, an electronic gaming device, a personal digital assistant (PDA), or another type of electronic device comprising information communication functionality.

For a variety of reasons (e.g., broadcast monitoring, advertising, content rights management, interactive applications, etc.), it can be useful for an entity (e.g., content provider, etc.) to identify respective content that is being presented to different users on different communication devices. Content fingerprinting (e.g., digital video or audio content fingerprinting) can be used to facilitate identifying content that is being presented to users on their communication devices. A content fingerprint can be generated by identifying and extracting characteristic components of the content, and processing (e.g., compressing) the characteristic components of the content to form the content fingerprint. A content fingerprint for an unidentified piece of content (e.g., presented on a communication device of a user) can be compared to a reference content fingerprint that is associated with a known piece of content, wherein there can be known information (e.g., name of movie, name of song, name of artist, etc.) regarding the content associated with the reference content fingerprint. If the content fingerprint matches the reference content fingerprint, the unidentified piece of content can be identified based on the known information associated with the reference content fingerprint.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Disclosed herein is a system that can include a grouper component that groups a subset of users of a plurality of users into a group of users based in part on a determination that respective content fingerprints associated with respective users of the subset of users meet a defined matching criterion for grouping users, wherein the respective content fingerprints are associated with respective content presented by communication devices to the respective users of the subset of users. The system also can include a content identification component that identifies content presented by a communication device to a user in the group of users, based in part on a comparison of a content fingerprint with a set of reference content fingerprints, and propagates the identification of the content presented by the communication device to the user to other users in the group of users to facilitate identification of the respective content presented to the other users in the group of users.

Also disclosed herein is a method that includes employing at least one processor to facilitate execution of code instructions retained in at least one memory device. The at least one processor, in response to execution of the code instructions, performs operations comprising: clustering users of a plurality of users to form a set of users in response to determining that respective content fingerprints associated with respective users in the set of users meet a defined matching criterion for clustering of users, wherein the respective content fingerprints are associated with respective content presented by communication devices to the respective users of the set of users; identifying content presented by a communication device associated with a user in the set of users, based in part on a comparison of a content fingerprint with a set of reference content fingerprints; and propagating the identification of the content presented by the communication device to the user to other users in the set of users to facilitate identifying the respective content presented to the other users in the set of users.

Also disclosed herein is a tangible computer-readable medium comprising computer-executable instructions that, in response to execution, cause a system including a processor to perform operations. The operations comprise clustering users to form a group of users from a plurality of users in response to determining that respective first-tier content fingerprints associated with respective users in the group of users meet a defined matching criterion for grouping of users, wherein the respective first-tier content fingerprints are associated with respective content presented by communication devices to the respective users of the group of users. The operations also include determining a first-tier identification of content presented by a communication device to a user in the group of users, in response to a comparison of a first-tier content fingerprint with a first-tier reference content fingerprint of a set of first-tier reference content fingerprints indicating that the first-tier content fingerprint and the first-tier reference content fingerprint are a match with each other in accordance with the defined matching criterion, wherein the first-tier reference content fingerprint is associated with first content identification information that facilitates the first-tier identification of content presented by the communication device to the user. The operations further include receiving, from an external identification service device, a second-tier identification of content presented by the communication device to the user, wherein the second-identification of content is based in part on a comparison of a second-tier content fingerprint with a second-tier reference content fingerprint of a set of second-tier reference content fingerprints indicating that the second-tier content fingerprint and the second-tier reference content fingerprint are a match with each other in accordance with the defined matching criterion, wherein the second-tier reference content fingerprint is associated with second content identification information that facilitates the second-tier identification of content presented by the communication device to the user. The operations also comprise identifying the content presented by the communication device to the user based in part on an evaluation of the first-tier identification of content and the second-tier identification of content. The operations further comprise applying the identification of the content presented by the communication device to the user to other users in the group of users to facilitate identifying the respective content presented to the other users in the group of users.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
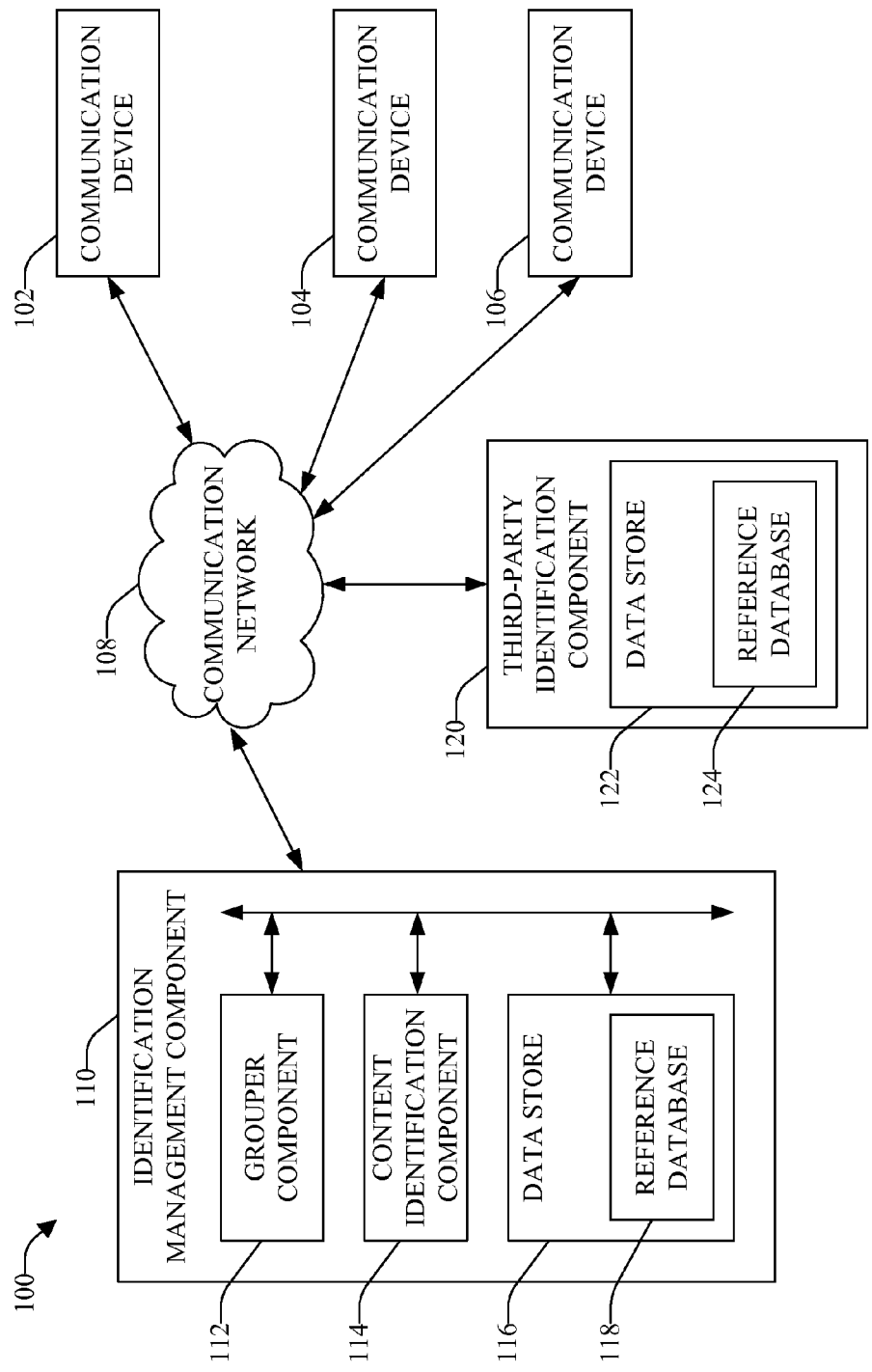
FIG. 1 illustrates a block diagram of an example system that can identify content (e.g., video or audio content) presented by communication devices associated with respective users using content fingerprints (e.g., digital content fingerprints) in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Communication devices (e.g., computers, mobile phones, electronic tablets, etc.) can be used to perceive (e.g., view, listen to) content, such as video or audio content. The video or audio content can be obtained from, for example, a communication device itself, or from another communication device connected via a communication network to the communication device. Communication devices that can be used to present content can include, for example, a computer, a mobile phone, a television, an Internet protocol (IP) television (IPTV), a set-top box, a content-streaming device, an electronic tablet, an electronic pad, an electronic notebook, an electronic reader, an electronic gaming device, a personal digital assistant (PDA), or another type of electronic device comprising information communication functionality.

For a variety of reasons (e.g., broadcast monitoring, advertising, content rights management, interactive applications, etc.), it can be useful for an entity (e.g., content provider, etc.) to identify respective content that is being presented to different users on different communication devices. Content fingerprinting (e.g., digital video or audio content fingerprinting) can be used to facilitate identifying content that is being presented to users on their communication devices. A content fingerprint can be generated by identifying and extracting characteristic components of the content, and processing (e.g., compressing) the characteristic components of the content to form the content fingerprint. A content fingerprint for an unidentified piece of content (e.g., presented on a communication device of a user) can be compared to a reference content fingerprint that is associated with a known piece of content, wherein there can be known information (e.g., name of movie, name of song, name of artist, etc.) regarding the content associated with the reference content fingerprint. If the content fingerprint matches the reference content fingerprint, the unidentified piece of content can be identified based on the known information associated with the reference content fingerprint.

Third-party fingerprint identification services can be used to facilitate identifying content presented on communication devices. However, there can be costs involved in using a third-party fingerprint identification services to identify content. For example, a third-party fingerprint identification service may charge a fee for each query or request to the third-party fingerprint identification service to identify content being presented on a communication device of a user. The more queries or requests made to the third-party fingerprint identification service to identify content, the higher the cost. There also can be resource costs incurred with regard to using a third-party fingerprint identification services to identify content. Still another issue (e.g., deficiency) in content identification can be that there can be mistakes made in content identification based on deficiency in the quality of matching of content fingerprints to reference content fingerprints.

To that end, techniques for identifying video and/or audio content using content fingerprints (e.g., digital content fingerprints) are presented. The disclosed subject matter can use cross-matching between content being presented on communication devices to users and matching a content fingerprint(s) associated with the content being presented to the users against reference data (e.g., reference content fingerprints) to facilitate identifying the content being presented on the communication devices to the users.

A plurality of communication devices associated with a plurality of users can be used to present content (e.g., video or audio content) to the respective users. Some communication devices can be presenting the same content (e.g., same movie, music video, or TV show, etc.) to respective users, and other communication devices may be presenting other content to other users. The plurality of communication devices can send (e.g., transmit) respective first content fingerprints (e.g., first-tier or internal content fingerprints) to an identification management component (e.g., in response to a request from the identification management component). A communication device can generate a content fingerprint (e.g., first content fingerprint), for example, by identifying and/or extracting characteristic components of the content and generating the content fingerprint based at least in part on the characteristic components of the content. For instance, a content fingerprint can be compressed data relating to the characteristic components of the content.

The identification management component can receive the respective first content fingerprints from the plurality of communication devices. The identification management component can analyze the respective first content fingerprints to facilitate matching and grouping a subset of the users associated with a subset of the communication devices. In some implementations, the identification management component can compare the respective first content fingerprints to each other to facilitate identifying communication devices that can be presenting the same content, or at least potentially can be presenting the same content, to respective users associated with the respective communication devices. For example, the identification management component can compare a given first content fingerprint received from one of the communication devices to other first content fingerprints received from other communication devices to facilitate matching at least some of the other first content fingerprints to the given first content fingerprint based at least in part on a defined matching criterion(s), in accordance with a first (e.g., first-tier or internal) fingerprint algorithm, wherein the defined matching criterion(s) can indicate that those first content fingerprints, which are associated with communication devices of respective users that are determined to be a match with the given first content fingerprint, can be associated with communication devices that are presenting or at least potentially presenting the same content as the communication device associated with the given first content fingerprint. The identification management component can compare the respective characteristic components of the respective first content fingerprints to identify or determine first content fingerprints associated with respective users that satisfy the defined matching criterion(s). The identification management component can group the subset of users based at least in part on the comparison results of the comparison of the first content fingerprints to each other (e.g., to a given first first content fingerprint) and the defined matching criterion(s). For example, the identification management component can group the subset of users into a group based at least in part on the respective first content fingerprints having at least a defined set of characteristic components in common (e.g., even if the comparison results do not show that the respective first content fingerprints have every characteristic component in common, for example, with each other or the given first content fingerprint).

In other implementations, the identification management component can compare the respective first content fingerprints to reference content fingerprints that can be stored in a data store (e.g., a data store comprising a reference database having first reference content fingerprints), wherein the first reference content fingerprints can be respectively associated with respective reference content and respective information identifying the respective reference content. The identification management component can identify or determine a subset of first content fingerprints associated with respective users that can sufficiently match a first reference content fingerprint of the stored first reference content fingerprints to satisfy the defined matching criterion(s). The identification management component can group the subset of users based at least in part on the comparison results of the comparison of the first content fingerprints with the first reference content fingerprints and the defined matching criterion(s). For example, the identification management component can group the subset of users into a group based at least in part on the respective first content fingerprints having at least a defined set of characteristic components that are in common (e.g., match) with a defined set of characteristic components of a first reference content fingerprint (e.g., even if the comparison results do not show that those respective first content fingerprints have every characteristic component in common with the characteristic components of the first reference content fingerprint).

In some implementations, the identification management component can determine a preliminary grouping (e.g., preliminary clustering) of users and/or communication devices associated with the first content fingerprints based at least in part on comparing a given first content fingerprint associated with a user and communication device with the other first content fingerprints associated with the other users and communication devices. Using the preliminary grouping, the identification management component can determine a grouping of users and/or communication devices associated with the first content fingerprints based at least in part on comparing first reference content fingerprints from the reference database with the first content fingerprints associated with the users and communication devices in the preliminary grouping. By doing a preliminary grouping and using the preliminary grouping to facilitate matching with a first reference content fingerprint, the identification management component can facilitate more efficiently (e.g., more easily) identifying matches and/or improving the matching quality. This is because the identification management component can use aggregated information, which can be derived from the preliminary grouping of users and/or associated communication devices, to facilitate matching the first content fingerprints associated with users in the preliminary group to a first reference content fingerprint to match and group users and/or associated communication devices in the grouping and identify or at least potentially identify the content being presented by the communication devices associated with those grouped users, based at least in part on the comparison with the first reference content fingerprint.

The identification management component also can dynamically perform the grouping of users (and associated communication devices) that are determined to be associated with the same content, or at least potentially associated with the same content. In particular, a group of users (and associated communication devices) can denote a set of matched content that is returned for a single query for content identification.

At times it may be useful to use third-party (e.g., external) identification services to facilitate identifying content (e.g., in additional to using internal identification services, as performed by the identification management component). As desired, the identification management component can utilize a third-party identification component that can provide third-party identification services to facilitate identifying content being presented on the communication devices associated with the group of users. The third-party identification services typically use a proprietary fingerprint algorithm, which can be obfuscated to keep other entities from discovering such fingerprint algorithm. As a result, the grouping phase sometimes cannot be performed using the third-party identification services. Also, unless the identification management component has access to the proprietary fingerprint algorithm, the identification management component may have limited ability to analyze content fingerprints that are based on the proprietary fingerprint algorithm. The identification management component, however, can still perform the grouping of users (and associated communication devices) that are determined to be associated with the same content, or at least potentially associated with the same content, based at least in part on the first (e.g., internal or first-tier) fingerprint algorithm, as disclosed herein.

In some implementations, on behalf of a group, the identification management component can send a request or query for information (e.g., a request or query for a second content fingerprint or other information (e.g., metadata)) to a third-party identification component(s) to facilitate identifying the content for the group. Once the identification management component has identified the group of users and/or respectively associated communication devices based at least in part on their respectively associated first content fingerprints, the identification management component can send (e.g., transmit) the request for information to a communication device of a user in the group to facilitate obtaining a second content fingerprint from that communication device. For instance, the identification management component can identify or determine a first content fingerprint associated with a communication device and user in the group that is to be used as a representative of the group, based at least in part on a defined matching criterion(s), to facilitate obtaining an exemplar second content fingerprint to use for the group to facilitate identifying the content associated with the group. In some instances, the identification management component can determine that more than one communication device and associated users in the group are to be selected for obtaining second content fingerprints, in accordance with a defined matching criterion(s), and can send requests for information to each of those selected communication devices.

In response to the request for information, a communication device can generate or obtain a second content fingerprint associated with (e.g., representative of) the content being presented by the communication device, and/or can identify other metadata responsive to the request. The communication device can transmit the metadata, including the second content fingerprint, to the identification management component.

The identification management component can receive the metadata from the communication device. The identification management component can utilize and/or leverage the metadata received from the communication device associated with the first content fingerprint that is representative of the group for the other users (and other associated communication devices) in the group to facilitate identifying the content for the respective users and communication devices in the group and/or can propagate such metadata to the respective other communication devices associated with the group. By leveraging the metadata associated with one user in the group to use such metadata for other users in the group, the identification management component can facilitate reducing or minimizing the costs (e.g., financial costs, resource costs, etc.) associated with identifying content associated with users (e.g., identifying content being presented by communication devices to users).

The identification management component can generate a request for content identification that includes the second content fingerprint obtained from the metadata and/or other of the metadata, and can transmit the request to the third-party identification component. The third-party identification component can analyze the second content fingerprint and/or other metadata associated with the request, and can compare the second content fingerprint (e.g., characteristic components of the second content fingerprint) to second reference content fingerprints (e.g., respective characteristic components of the second reference content fingerprints) that the third-party identification component can obtain from a reference database (e.g., stored in a data store) of the third-party identification component, in accordance with a second (e.g., second-tier or external) fingerprint algorithm. The second reference content fingerprints can be respectively associated with respective reference content and respective information identifying the respective reference content. The third-party identification component can identify the content associated with the second content fingerprint based at least in part on the analysis and/or comparison, and a defined matching criterion(s) (e.g., associated with the second fingerprint algorithm).

The third-party identification component can generate a response message (e.g., result message) to the request, wherein the response message can include information that can identify the content, based at least in part on the content identification made by the third-party identification component. The third-party identification component can transmit the response message to the identification management component.

In certain other implementations, the communication devices can generate requests for content identification to the third-party identification component, wherein a request for content identification can include a second content fingerprint associated with the content being presented by a communication device that generated the request for content identification. The third-party identification component can analyze the respective second content fingerprints and/or other metadata associated with the respective requests, and can compare the second content fingerprint (e.g., characteristic components of the second content fingerprint) to second reference content fingerprints (e.g., respective characteristic components of the second reference content fingerprints), which the third-party identification component can obtain from a reference database of the third-party identification component, in accordance with the second fingerprint algorithm. For each of the respective requests, the third-party identification component can identify the content associated with the second content fingerprint in the request based at least in part on the analysis and/or comparison, and a defined matching criterion(s) (e.g., associated with the second fingerprint algorithm).

The third-party identification component can send response messages to the communication devices, wherein a response message can include information that can identify the content that was being presented by the communication device that sent the request for content identification. The respective communication devices can receive the respective response messages from the third-party identification component. Each (or a desired portion) of the communication devices can generate a first content fingerprint based at least in part on the content being presented by that communication device to the user. Each (or a desired portion) of the communication devices can transmit the first content fingerprint and the content identification obtained from the third-party identification component to the identification management component.

The identification management component can analyze the respective first content fingerprints, in accordance with the first fingerprint algorithm, and the respective content identifications to facilitate grouping users perceiving the same content and/or associated communication devices that are presenting the same content into a group, based at least in part on a defined matching criterion(s). The grouping by the identification management component can serve to improve the quality of the matching of users or communication devices associated with the same content, as the identification management component can cross-check the matching results of the comparison of the respective first content fingerprints associated with the respective communication devices (and users) with the matching results of the comparison of the respective content identifications associated with the respective communication devices (and users) to improve the accuracy or quality of the matching or grouping of users.

In still other implementations, the identification management component can decide to bypass the grouping phase using the first content fingerprints and can use direct identification to facilitate identifying the content associated with respective communication devices (and users) and grouping of users and associated communication devices that are associated with the same content. For instance, the identification management component can use a same fingerprint algorithm (e.g., first fingerprint algorithm or second fingerprint algorithm) to perform both the grouping of users and associated communication devices that are associated with the same content (or at least potentially associated with the same content) and the content identification for content presented by respective communication devices based on external (e.g., third-party) queries.

Referring now to the drawings, FIG. 1 illustrates a block diagram of an example system 100 that can identify content (e.g., video or audio content) presented by communication devices associated with respective users using content fingerprints (e.g., digital content fingerprints) in accordance with various aspects and implementations described herein. The disclosed subject matter can use cross-matching between content being presented on communication devices to users and matching a content fingerprint(s) associated with the content being presented to the users against reference data (e.g., reference content fingerprints) to facilitate identifying the content being presented on the communication devices to the users.

The system 100 can include a plurality of communication devices, including communication device 102, communication device 104, and communication device 106, that each can receive or transmit information (e.g., video content, audio content, textual information or messages, etc.), and/or can present information to users. For instance, the plurality of communication devices, including communication devices 102, 104, and 106, can receive respective content from one or more content providers, and can present the respective content to respective users using the communication devices. A communication device (e.g., 102, 104, 106, etc.) can be or can include, for example, a television, an IPTV, a set-top box, a computer, a content-streaming device, a mobile phone, an electronic tablet, an electronic pad, electronic notebook, an electronic reader, an electronic gaming device, a personal digital assistant (PDA), an electronic device (e.g., electronic eyewear or bodywear) comprising information communication functionality, etc.

The plurality of communication devices (e.g., 102, 104, 106, etc.) can be associated with (e.g., communicatively connected to) a communication network 108 that can facilitate communication (e.g., receiving, transmitting) of information between the communication devices and other communication devices associated with the communication network 108. The communication network 108 can include an Internet protocol (IP)-based network and/or a core network (e.g., mobile core network) that can facilitate wireline or wireless communication of information between a communication device and another communication device(s) associated with the communication network 108.

The system 100 also can include an identification management component 110 that can facilitate identifying content (e.g., video or audio content) presented by the plurality of communication devices associated with respective users using content fingerprints (e.g., digital content fingerprints) associated with the respective content being presented by the plurality of communication devices. The identification management component 110 can be associated with (e.g., communicatively connected to) the communication network 108 via a wireline or wireless communication connection.

The identification management component 110 can comprise a grouper component 112 that can group users and/or associated communication devices (e.g., 102, 104, 106) that are determined to be associated with the same content based at least in part on respective first content fingerprints (e.g., first-tier or internal content fingerprints) associated with content presented by the communication devices (e.g., 102, 104, 106), in accordance with a first (e.g., first-tier or internal) fingerprint algorithm and a defined matching criterion(s). The identification management component 110 also can include a content identification component 114 that can facilitate identifying content being presented by a group of communication devices (e.g., 102, 104, 106) to the associated group of users based at least in part on a first content fingerprint(s) and/or a second content fingerprint(s) (e.g., second-tier or external content fingerprint(s)) associated with the group of communication devices and group of users.

The identification management component 110 further can comprise a data store 116 that can store and provide data, including, for example, content fingerprints (e.g., first content fingerprints, second content fingerprints), reference content fingerprints (e.g., first reference content fingerprints), other metadata associated with content being presented by communication devices, user profiles associated with respective users, or other information. The data store 116 can contain a reference database 118 that can contain or store reference content fingerprints and respectively associated identification information (e.g., name of movie, video, song, etc.; name of an artist(s) associated with the content; etc.) that can facilitate identifying respective content that is associated with the respective reference content fingerprints.

At various times, the plurality of communication devices, including communication devices 102, 104, and 106, associated with a plurality of users can be used to present content (e.g., video or audio content) to the respective users. Some communication devices (e.g., 102, 104, 106) can be presenting the same content (e.g., same movie, music video, or TV show, etc.) to respective users, and other communication devices (not shown in FIG. 1) may be presenting other content to other users. The plurality of communication devices, including communication devices 102, 104, and 106, can generate first content fingerprints based at least in part on the respective content being presented by the respective communication devices. The plurality of communication devices, including communication devices 102, 104, and 106, can send (e.g., transmit) the respective first content fingerprints to the identification management component 110 (e.g., in response to a request from the identification management component 110). A communication device (e.g., 102, 104, 106, etc.) can generate a content fingerprint (e.g., first content fingerprint), for example, by identifying and/or extracting characteristic components of the content and generating the content fingerprint based at least in part on the characteristic components of the content. For instance, a content fingerprint can be compressed data relating to the characteristic components of the content. The first content fingerprints can be generated, for example, in accordance with a first (e.g., a first-tier or internal) fingerprint algorithm.

The identification management component 110 can receive the respective first content fingerprints from the plurality of communication devices (e.g., 102, 104, 106, etc.). The grouper component 112 can analyze the respective first content fingerprints to facilitate matching and grouping a subset of the users associated with a subset of the communication devices (e.g., 102, 104, 106). In some implementations, the grouper component 112 can compare the respective first content fingerprints (e.g., compare the respective characteristic components of the respective first content fingerprints) to each other (e.g., can cross-check the first content fingerprints against each other) to facilitate identifying or determining communication devices (e.g., 102, 104, 106) that can be presenting the same content, or at least potentially can be presenting the same content, to respective users associated with the respective communication devices (e.g., 102, 104, 106). The grouper component 112 can compare a given first content fingerprint (e.g., given characteristic components of the given first content fingerprint) received from one communication device (e.g., communication device 102) of the communication devices to other first content fingerprints (e.g., other respective characteristic components of the other respective first content fingerprints) received from other communication devices (e.g., communication devices 104, 106, etc.) to facilitate matching at least some of the other first content fingerprints to the given first content fingerprint based at least in part on a defined matching criterion(s), in accordance with the first fingerprint algorithm. For instance, the grouper component 112 can compare the respective characteristic components of the respective first content fingerprints to identify or determine first content fingerprints associated with respective users that satisfy the defined matching criterion(s). The defined matching criterion(s) can specify or indicate, for example, that the first content fingerprints, which are associated with communication devices (e.g., 104, 106) of respective users, that have at least a defined set (e.g., a defined number and/or type) of characteristic components in common (e.g., match) with the characteristic components of the given first content fingerprint can be determined to be a match to the given first content fingerprint (e.g., even if the comparison results do not show that those first content fingerprints have every characteristic component in common with the characteristic components of the given first content fingerprint). A determination that there is a match between a first content fingerprint associated with a communication device (e.g., 104) (and associated user) and the given first content fingerprint associated with a given communication device (e.g., 102) (and associated user) can mean or indicate that the content presented by the communication device (e.g., 104) associated with the first content fingerprint is the same content (e.g., is determined to be the same content), or at least potentially can be the same content, as the content being presented by the given communication device (e.g., 102) associated with the given first content fingerprint.

It is noted that, depending in part on various factors, content fingerprints (e.g., first content fingerprints, second content fingerprints) generated from respective content presented by communication devices to respective users can or may match each other even if the respective content on which the content fingerprints were generated only partially overlap, and users can "survive" in a group (e.g., users can properly remain in a group based on a defined matching criterion(s)) or a group of users can "survive" (e.g., a group of users can properly remain grouped together based on a defined matching criterion(s)) by successively matching content fingerprints that are generated on later content fragments of the respective content presented by respective communication devices to the respective users. Therefore, once the identification management component 110 identifies content for a given group of users, such content identification can be reused for an extended period of time (e.g., a defined period of time, in accordance with the defined matching criterion(s)). In the case of popular television channels, the amount of users that can be matched together by the identification management component 110, and therefore the frequency of received content fingerprints, can allow for maintaining a content identification associated with a given group of users for a desirable (e.g., relatively long) period of time.

The grouper component 112 can group the subset of users based at least in part on the comparison results of the comparison of the first content fingerprints and the defined matching criterion(s). For example, the grouper component 112 can group the subset of users into a group based at least in part on the respective first content fingerprints (e.g., the given first content fingerprint and at least some other of the first content fingerprints) having at least a defined set of characteristic components in common (e.g., even if the comparison results do not show that the given first content fingerprint and such other of the first content fingerprints have every characteristic component in common).

In other implementations, the grouper component 112 can compare the respective first content fingerprints associated with the communication devices (e.g., 102, 104, 106, etc.) to reference first content fingerprints that can be stored in the reference database 118 in the data store 116, wherein the first reference content fingerprints can be respectively associated with respective reference content and respective identification information that can facilitate identifying the respective reference content. The grouper component 112 can identify or determine a subset of first content fingerprints associated with respective users (and respective communication devices (e.g., 102, 104, 106) that can sufficiently match a first reference content fingerprint of the stored first reference content fingerprints to satisfy the defined matching criterion(s). The grouper component 112 can group the subset of users based at least in part on the comparison results of the comparison of the first content fingerprints with the first reference content fingerprints and the defined matching criterion(s). For example, the identification management component 110 can group the subset of users into a group based at least in part on the respective first content fingerprints having at least a defined set (e.g., number and/or type) of characteristic components that are in common with a defined set of characteristic components of a first reference content fingerprint (e.g., even if the comparison results do not show that those respective first content fingerprints have every characteristic component in common with the characteristic components of the first reference content fingerprint).

In some implementations, the grouper component 112 can determine or identify a preliminary grouping (e.g., preliminary clustering) of users and/or communication devices (e.g.,

102, 104, 106) associated with the first content fingerprints based at least in part on comparing a given first content fingerprint associated with a user and communication device with the other first content fingerprints associated with the other users and communication devices. Using the preliminary grouping, the grouper component 112 can determine or identify a grouping of users and/or communication devices (e.g., 102, 104, 106) associated with the first content fingerprints based at least in part on comparing first reference content fingerprints from the reference database 118 with the first content fingerprints associated with the users and communication devices (e.g., 102, 104, 106) in the preliminary grouping. By doing a preliminary grouping and using the preliminary grouping to facilitate matching with a first reference content fingerprint, the grouper component 112 can facilitate more efficiently (e.g., more easily) identifying matches and/or improving the matching quality. This is because the grouper component 112 can use aggregated information, which can be derived from the preliminary grouping of users and/or associated communication devices, to facilitate matching the first content fingerprints associated with users and communication devices in the preliminary group to a first reference content fingerprint to match and group users and/or associated communication devices in the grouping and identify, or at least potentially identify, the content being presented by the communication devices associated with those grouped users, based at least in part on the comparison of the first content fingerprints associated with the users with the first reference content fingerprint.

The grouper component 112 also can dynamically perform the grouping of users (and associated communication devices (e.g., 102, 104, 106)) that are determined to be associated with the same content, or at least potentially associated with the same content. In particular, a group of users (and associated communication devices) can denote a set of matched content that is returned for a single query for content identification.

At times it may be useful to use third-party (e.g., external) identification services to facilitate identifying content (e.g., in additional to using internal identification services, as performed by the identification management component 110). As desired, the identification management component 110 can be associated with and can utilize a third-party identification component(s) 120 that can provide third-party identification services to facilitate identifying content being presented on the communication devices (e.g., 102, 104, 106, etc.) associated with the group of users. The third-party identification services typically can use a proprietary fingerprint algorithm, which can be obfuscated to keep other entities (e.g., the identification management component 110) from discovering such fingerprint algorithm. As a result, the grouping phase sometimes may not be able to be performed using the third-party identification services. Also, unless the identification management component 110 has access to the proprietary fingerprint algorithm, the identification management component 110 may have limited ability to analyze content fingerprints that are based on the proprietary fingerprint algorithm. The identification management component 110, however, can still perform the grouping of users (and associated communication devices (e.g., 102, 014, 106)) that are determined to be associated with the same content, or at least potentially associated with the same content, and/or identify content associated with a group of users, based at least in part on the first (e.g., internal or first-tier) fingerprint algorithm, as disclosed herein.

The third-party identification component 120 can be associated with the identification management component 110 via the communication network 108 and/or via another communication network. As more fully disclosed herein, the third-party identification component 120 can evaluate a second content fingerprint(s) associated with content in connection with a group of users by comparing the second content fingerprint(s) to second reference content fingerprints to facilitate identifying the content, in accordance with a second (e.g., second-tier or external) fingerprint algorithm. The third-party identification component 120 can comprise a data store 122 that can store and provide data including, for example, content fingerprints (e.g., second content fingerprints), reference content fingerprints (e.g., second reference content fingerprints), other metadata associated with content being presented by communication devices, user profiles associated with respective users, or other information. The data store 122 can contain a reference database 124 that can contain or store and provide the second reference content fingerprints and respectively associated identification information (e.g., name of movie, video, song, etc.; name of an artist(s) associated with the content; etc.) that can facilitate identifying respective content that is associated with the respective second reference content fingerprints.

In some implementations, on behalf of an identified group of users, the identification management component 110 can send a request or query for information (e.g., a request or query for a second content fingerprint or other information (e.g., metadata)) to the third-party identification component 120 to facilitate identifying the content for the group. Once the identification management component 110 has identified the group of users and/or respectively associated communication devices (e.g., 102, 104, 106) based at least in part on their respectively associated first content fingerprints, the identification management component 110 can send (e.g., transmit) the request for information to a communication device (e.g., 102) of a user in the group to facilitate obtaining a second content fingerprint from that communication device (e.g., 102). For instance, the identification management component 110 (e.g., grouper component 112 of the identification management component 110) can identify or determine a first content fingerprint associated with a communication device (e.g., 102) and user in the group that is to be used as a representative of the group, based at least in part on a defined matching criterion(s), to facilitate obtaining an exemplar second content fingerprint to use for the group to facilitate identifying the content associated with the group. In some instances, the identification management component 110 can determine that more than one communication device (e.g., communication devices 102 and 104) and associated users in the group are to be selected for obtaining second content fingerprints, in accordance with a defined matching criterion(s), and can send requests for information to each of those selected communication devices (e.g., communication devices 102 and 104).

In response to the request for information, a communication device (e.g., communication device(s) 102 and/or 104) can generate or obtain a second content fingerprint associated with (e.g., representative of) the content being presented by the communication device(s), and/or can identify other metadata responsive to the request. The communication device(s) (e.g., communication device(s) 102 and/or 104) can transmit the metadata, including the second content fingerprint, to the identification management component 110 (e.g., via a response message).

The identification management component 110 can receive the metadata from the communication device (e.g., 102). The identification management component 110 can utilize and/or leverage the metadata received from the communication device (e.g., 102) associated with the first content fingerprint that is representative of the group for the other users (and other associated communication devices (e.g., 104, 106)) in the group to facilitate identifying the content for the respective users and communication devices (e.g., 102, 104, 106) in the group and/or can propagate such metadata to the respective other communication devices (e.g., 104, 106) associated with the group. By leveraging the metadata associated with one user in the group to use such metadata for other users in the group, the identification management component 110 can facilitate reducing or minimizing the costs (e.g., financial costs, resource costs, etc.) associated with identifying content associated with users (e.g., identifying content being presented by communication devices to users).

The content identification component 114 can generate a request for content identification that can include the second content fingerprint obtained from the metadata and/or other of the metadata, and can transmit the request to the third-party identification component 120. The third-party identification component 120 can analyze the second content fingerprint and/or other metadata associated with the request, and can compare the second content fingerprint (e.g., characteristic components of the second content fingerprint) to second reference content fingerprints (e.g., respective characteristic components of the second reference content fingerprints) that the third-party identification component 120 can obtain from a reference database 124 that can be stored in the data store 122, in accordance with the second fingerprint algorithm. The second reference content fingerprints can be respectively associated with respective reference content and respective identification information that can facilitate identifying the respective reference content. The third-party identification component 120 can identify the content associated with the second content fingerprint based at least in part on the analysis and/or comparison, and a defined matching criterion(s) (e.g., associated with the second fingerprint algorithm).

The third-party identification component 120 can generate a response message (e.g., result message) to the request, wherein the response message can include identification information that can facilitate identifying the content, based at least in part on the content identification made by the third-party identification component 120. The third-party identification component 120 can transmit the response message to the identification management component 110.

The identification management component 110 can receive the response message from the third-party identification component 120. The content identification component 114 can analyze the identification information relating to the content associated with the group of users (and/or associated group of communication devices) that was provided by the third-party identification component 120 and the identification information relating to the content associated with the group of users (and/or associated group of communication devices) that was obtained in connection with the analysis of first content fingerprint(s) associated with the group of users (and/or associated group of communication devices) by the identification management component 110. Based at least in part on this analysis, the content identification component 114 can determine or identify the content being presented by the communication device (e.g., 102) associated with the content fingerprint that was selected to be the exemplar for the group of users (and/or associated group of communication devices), and/or can propagate that content identification to the other users in the group of users (and/or associated communication devices (e.g., 104, 106) in the associated group of communication devices) to identify the content being presented by the other communication devices (e.g., 104, 106) in the device group to the other users in the user group.

It is to be appreciated and understood that, while one third-party identification component (e.g., 120) associated with one third-party identification service is depicted in FIG. 1, this disclosure is not so limited, as there can be multiple third-party identification components, which can be associated with respective third-party identification services, that can be associated with the identification management component 110 to facilitate performing second-tier content identification of content with respect to a group of users. For content associated with a given group of users, the identification management component 110 can employ one or more third-party identification components to perform second-tier content identification with regard to such content, and the one or more third-party identification components can perform second-tier content identification of such content, in accordance with the respective defined fingerprint algorithms of the respective second-tier identification components.

In some implementations, before engaging in a second-tier identification of the content for a group of users (e.g., involving the third-party identification component 120), the content identification component 114 can determine (e.g., calculate) a confidence level (e.g., confidence score) for the content identification associated with the group of users to facilitate determining whether to bypass the second-tier content identification for the group of users. For example, the content identification component 114 can determine a first confidence level that a first content fingerprint (e.g., exemplar first content fingerprint (e.g., associated with communication device 102)) that is selected to be representative of the group of users is sufficiently similar to the other first content fingerprints associated with the group such that the content identification for the exemplar first content fingerprint will accurately apply to the other first content fingerprints. Additionally or alternatively, the content identification component 114 can determine a second confidence level that the content identification made by the content identification component 114, based on the comparison of the exemplar first content fingerprint with the first reference content fingerprint, accurately identifies the content being presented by the communication device (e.g., 102) associated with the exemplar first content fingerprint. The content identification component 114 can determine an overall confidence level, based at least in part on the first confidence level and/or second confidence level. The content identification component 114 can determine the overall confidence level the first confidence level, and/or second confidence level based at least in part on a defined matching criterion(s), which can comprise matching criterion(s) and/or content identification criterion(s).

The content identification component 114 can compare the overall confidence level with a defined threshold confidence level that indicates whether the first-tier content identification is sufficiently accurate to allow the second-tier content identification to be bypassed. If the overall confidence level satisfies the defined threshold confidence level (e.g., if the overall confidence level is relatively high (e.g., at or above 90% confidence or other desired threshold percentage)), the content identification component 114 can determine that the first-tier content identification for the group of users (e.g., based on the content identification made using the first content fingerprints only) is sufficiently accurate that the second-tier content identification (e.g., using the third-party identification services) is unnecessary. In such instance, the content identification component 114 can determine that the content identification based on the first-tier content identification can apply to the group of users, and that the second-tier content identification can be bypassed.

If the overall confidence level does not satisfy the defined threshold confidence level (e.g., if the overall confidence level is not high enough to satisfy the threshold (e.g., below 90% confidence or other desired threshold percentage)), the content identification component 114 can determine that the first-tier content identification for the group of users (e.g., based on the content identification made using the first content fingerprints only) is not sufficiently accurate enough to bypass the second-tier content identification (e.g., using the third-party identification services). In such instance, the identification management component 110 can proceed to use third-party identification services to facilitate identification of the content for the group of users.

In accordance with certain other implementations, the communication devices (e.g., 102, 104, 106, etc.) can generate requests for content identification to the third-party identification component 120 via the communication network 108, wherein a request for content identification can include a second content fingerprint associated with the content being presented by a communication device that generated the request for content identification. The third-party identification component 120 can analyze the respective second content fingerprints and/or other metadata associated with the respective requests, and can compare the second content fingerprint (e.g., characteristic components of the second content fingerprint) to second reference content fingerprints (e.g., respective characteristic components of the second reference content fingerprints), which the third-party identification component 120 can obtain from a reference database 124, in accordance with the second fingerprint algorithm. For each of the respective requests, the third-party identification component 120 can identify the content associated with the second content fingerprint in the request based at least in part on the analysis and/or comparison, and a defined matching criterion(s) (e.g., associated with the second fingerprint algorithm).

The third-party identification component 120 can send response messages to the communication devices (e.g., 102, 104, 106, etc.), wherein a response message can include identification information that can facilitate identifying the content that was being presented by the communication device that sent the request for content identification. The respective communication devices (e.g., 102, 104, 106, etc.) can receive the respective response messages from the third-party identification component 120. Each (or a desired portion) of the communication devices (e.g., 102, 104, 106, etc.) can generate a first content fingerprint based at least in part on the content being presented by that communication device to the user. Each (or a desired portion) of the communication devices (e.g., 102, 104, 106, etc.) can transmit the first content fingerprint and the content identification obtained from the third-party identification component 120 to the identification management component 110.

The identification management component 110 (e.g., the grouper component and/or content identification component 114 of the identification management component 110) can analyze the respective first content fingerprints, in accordance with the first fingerprint algorithm, and the respective content identifications to facilitate grouping users perceiving the same content and/or associated communication devices that are presenting the same content into a group, based at least in part on a defined matching criterion(s). The grouping by the identification management component 110 can serve to improve the quality of the matching of users or communication devices associated with the same content, as the identification management component 110 can cross-check the matching results of the comparison of the respective first content fingerprints associated with the respective communication devices (and users) with the matching results of the comparison of the respective content identifications associated with the respective communication devices (and users) to improve the accuracy or quality of the matching or grouping of users.

In still other implementations, the identification management component 110 can decide to bypass the grouping phase using the first content fingerprints and can use direct identification to facilitate identifying the content associated with respective communication devices (and users) and grouping of users and associated communication devices that are associated with the same content. For instance, the identification management component 110 can use a same fingerprint algorithm (e.g., first fingerprint algorithm or second fingerprint algorithm) to perform both the grouping of users and associated communication devices that are associated with the same content (or at least potentially associated with the same content) and the content identification for content presented by respective communication devices based at least in part on external (e.g., third-party) queries.

Figure 2:
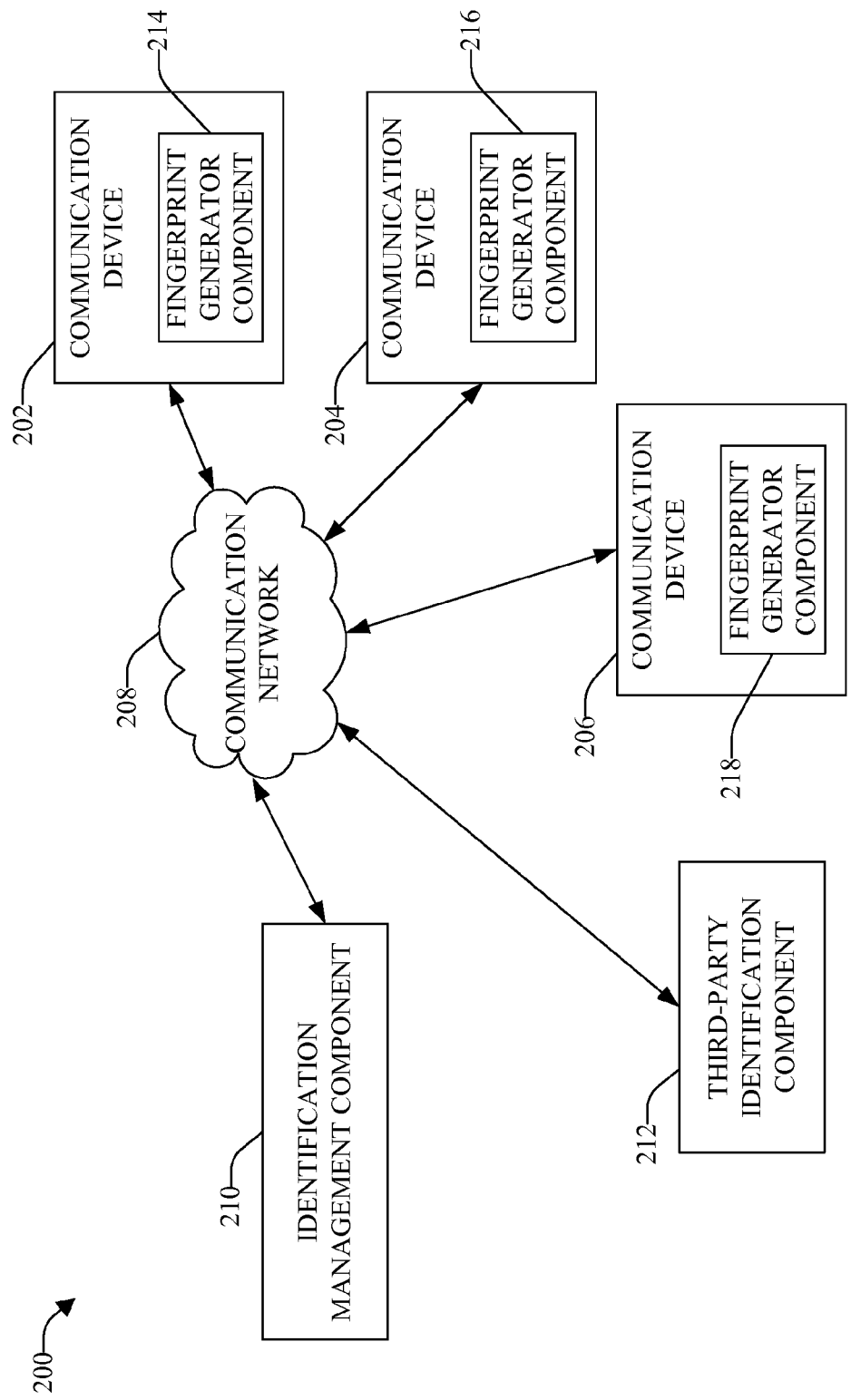
FIG. 2 depicts a diagram of an example system that can use content fingerprints to facilitate identifying content presented by communication devices associated with respective users, in accordance with various aspects and implementations described herein.

Turning to FIG. 2, depicted is a block diagram of an example system 200 that can use content fingerprints (e.g., digital content fingerprints) to facilitate identifying content (e.g., video or audio content) presented by communication devices associated with respective users, in accordance with various aspects and implementations described herein. The system 200 can include a plurality of communication devices, including communication device 202, communication device 204, and communication device 206, a communication network 208, an identification management component 210, and a third-party (e.g., external) identification component 212, which each can respectively be the same as or similar to, and/or can comprise the same or similar functionality as, respective components (e.g., respectively named components), as more fully disclosed herein. The plurality of communication devices, including communication devices 202, 204, and 206, the identification management component 210, and the third-party identification component 212 each can be communicatively connected to the communication network 208 via a wireline or wireless communication connection, at various desired times.

The plurality of communication devices, including communication devices 202, 204, and 206, each can include a fingerprint generator component, including fingerprint generator component 214, fingerprint generator component 216, and fingerprint generator component 218, respectively, that can generate content fingerprints based at least in part on (e.g., representative of) the content the respective communication devices (e.g., 202, 204, 206, etc.) are presenting to users at a given time. Each fingerprint generator component (e.g., 214, 216, 218, etc.) can generate a first (e.g., first-tier or internal) content fingerprint that can correspond to or be representative of content being presented by the associated communication device (e.g., 202, 204, 206, etc.) at a given time, and the communication device can transmit the first content fingerprint to the identification management component 210 to facilitate grouping of users (or grouping of associated communication devices) and identifying the content by the identification management component 210. The fingerprint generator component (e.g., 214, 216, 218, etc.) can generate the first content fingerprint in response to a request for the first content fingerprint received by the associated communication device (e.g., 202, 204, 206, etc.) from the identification management component 210, for example. The fingerprint generator component (e.g., 214, 216, 218, etc.) can generate the first content fingerprint in accordance with the first fingerprint algorithm, for example.

Each fingerprint generator component (e.g., 214, 216, 218, etc.) can generate a second (e.g., second-tier or external) content fingerprint that can correspond to or be representative of content being presented by the associated communication device (e.g., 202, 204, 206, etc.) at a given time, and the communication device can transmit the second content fingerprint to the identification management component 210 or the third-party identification component 212 to facilitate identification of the content. The fingerprint generator component (e.g., 214, 216, 218, etc.) also can generate the second content fingerprint in response to a request for the second content fingerprint received by the associated communication device (e.g., 202, 204, 206, etc.) from the identity management component 210 or the third-party identification component 212, for example. The fingerprint generator component (e.g., 214, 216, 218, etc.) can generate the second content fingerprint in accordance with the second fingerprint algorithm, for example.

The identification management component 210 can group users (or respectively associated communication devices (e.g., 202, 204, 206)) based at least in part on the respective first content fingerprints received from the respective communication devices (e.g., 202, 204, 206), based at least in part on a defined matching criterion(s), as more fully disclosed herein. The identification management component 210 also can facilitate identifying the content associated with a group of users based at least in part on a first content fingerprint associated with the group of users and a reference content fingerprint (e.g., first reference content fingerprint), as more fully disclosed herein.

The third-party identification component 212 can facilitate identifying content associated with a user (or associated communication device) or a group of users (or group of associated communication devices) based at least in part on a second reference content fingerprint, as more fully disclosed herein. The third-party identification component 212 can generate identification information that identifies the content based at least in part on the content identification determined by the third-party identification component 212.

The identification management component 210 can receive the identification information from the third-party identification component, or via a communication device (e.g., 202) (e.g., when the communication device directly sends the second content fingerprint to the third-party identification component). When the identification information for content relates to a second content fingerprint that is an exemplar content fingerprint for a group of users, the identification management component 210 can analyze the identification information, a content identification based at least in part on the first content fingerprint (e.g., exemplar first content fingerprint) associated with the group, and/or other information relating to the group of users. The identification management component 210 can determine or identify the content associated with the group of users (e.g., content being presented by the communication devices (e.g., 202, 204, 206) to the respective users in the group), wherein the identification of content for the exemplar or representative of (e.g., for the exemplar second content fingerprint associated with) the group of users (and associated communication devices) can be propagated to the other users of the group (and other communication devices of the associated group of communication devices), as more fully disclosed herein.

Figure 3:
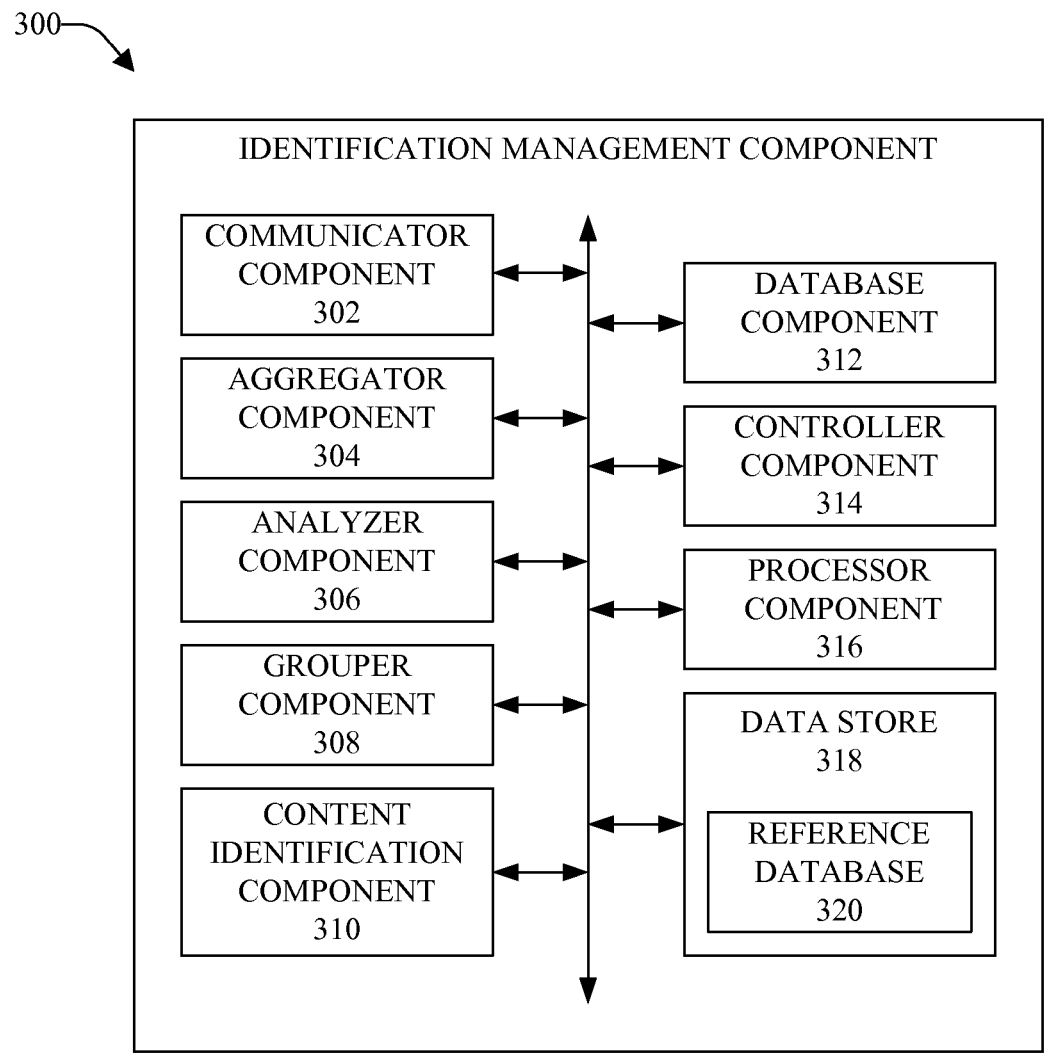
FIG. 3 illustrates a diagram of an example identification management component in accordance with various aspects and implementations disclosed herein.

FIG. 3 illustrates a block diagram of an example identification management component 300 in accordance with various aspects and implementations disclosed herein. The identification management component 300 can be contained within or associated with (e.g., communicatively connected to), a communication device. The identification management component 300 can include a communicator component 302, an aggregator component 304, and an analyzer component 306.

The communicator component 302 can be used to communicate (e.g., transmit, receive) information between the identification management component 300 and other components (e.g., communication device(s), component in a communication network, third-party identification component(s), user interface(s), processor component(s), data store(s), etc.). The information can include, for example, content fingerprints relating to content being presented by communication devices, requests for metadata, requests for content identification (e.g., requests for second-tier content identification, response messages from communication devices or third-party identification components, and/or other information. In some implementations, the communicator component 302 can establish a secured communication channel to communicate information, such as requests or messages between the identification management component 300 and another component(s) (e.g., communication device, component within a communication network, third-party identification component, etc.).

The aggregator component 304 can aggregate data received (e.g., obtained) from various entities (e.g., communication device(s), component in a communication network, third-party identification component(s), user interface(s), processor component(s), data store(s), etc.). The aggregator component 304 can correlate respective items of data based at least in part on type of data, source of the data, time or date the data was generated or received, group of users (or group of associated communication devices) with which the item of data (e.g., content fingerprint, content identification, etc.) is associated, etc., to facilitate analyzing of the data (e.g., by the analyzer component 306 or another component), grouping users into a group of users, identifying content, and/or performing other operations on the data.

The analyzer component 306 can analyze data to facilitate matching content fingerprints (e.g., first content fingerprints) with each other or with a first reference content fingerprint, grouping users associated with respective content being presented on their communication devices, identifying content associated with a group of users, etc., and can generate analysis results, based at least in part on the data analysis. For example, the analyzer component 306 (e.g., in conjunction with a grouper component 308) can analyze respective first content fingerprints relating to respective content being presented by communication devices to users to facilitate grouping users that are determined to be watching the same content into a group of users and/or identifying the content being presented to the group of users. The analyzer component 306 can provide the analysis results to, for example, the grouper component 308, the content identification component 310, or another component (e.g., processor component 316, data store 318) of the identification management component 300.

The grouper component 308 can perform various functions, such as functions relating to grouping users in relation to the content that users are perceiving (e.g., viewing) on their respective communication devices. The grouper component 308 can compare respective content fingerprints (e.g., first content fingerprints) associated with respective content presented by respective communication devices to respective users with each other or with a set of first reference content fingerprints stored in a reference database to facilitate matching those content fingerprints (and associated users) that are determined to be associated with the same content, or at least potentially associated with the same content. The grouper component 308 can group users associated with respective content being presented on their communication devices into a group of users when the users are determined to be watching the same content via their respective communication devices (e.g., based at least in part on the analysis results and in accordance with a defined matching criterion(s)).

The identification management component 300 also can include a content identification component 310 that can identify content associated with a group of users. The content identification component 310 can identify content associated with a group of users based at least in part on analysis results relating to analysis of first content fingerprints associated with the group of users, analysis of content identification information obtained from a second-tier content identification process (e.g., based at least in part on a second content fingerprint associated with the group of users) performed by a third-party management component, and/or analysis of other information (e.g., metadata associated with the group of users). The content identification component 310 also can propagate a content identification for an exemplar content fingerprint associated with a user of the group of users to other users in the group of users, as disclosed herein.

The identification management component 300 can comprise a database component 312 that can generate, maintain, and/or update a reference database 320, which can be stored in a data store 318 of the identification management component 300. The database component 312 can generate the reference database 320, which can include a set of reference content fingerprints (e.g., first reference content fingerprints) and content identification information that can be respectively associated with respective reference content fingerprints of the set. The database component 312 also can facilitate updating the reference database 320 to modify content identification information associated with a reference content fingerprint, or add a new reference content fingerprint and associated content identification information.

The identification management component 300 also can include a controller component 314 that can facilitate controlling operations of the various components of the identification management component 300 and/or can provide instructions to the various components of the identification management component 300 to facilitate the performance of various tasks and functions by the various components of the identification management component 300. The controller component 314 can perform operations and/or facilitate the performance of operations by other components of the identification management component 300, in accordance with a desired algorithm (e.g., first fingerprint algorithm) and desired criterion(s) (e.g., a defined matching criterion(s)).

In some implementations, the identification management component 300 also can include a processor component 316 that can operate with the other components (e.g., communicator component 302, aggregator component 304, analyzer component 306, etc.) to facilitate performing the various functions of the identification management component 300. The processor component 316 can employ one or more processors, microprocessors, or controllers that can process data, such as information relating to content fingerprints (e.g., first content fingerprints, first reference content fingerprints) or other metadata associated with content, information relating to a defined matching criterion(s), information relating to a defined fingerprint algorithm (e.g., first fingerprint algorithm), information relating to other operations of the identification management component 300, and/or other information, to facilitate matching content fingerprints (e.g., first content fingerprints) with each other or with a first reference content fingerprint, grouping users associated with respective content being presented on their communication devices, identifying content associated with a group of users, and/or performing other operations associated with the identification management component 300, as more fully disclosed herein. The processor component 316 can control or manage data flow between the identification management component 300 and other components (e.g., communication device(s), component in a communication network, third-party identification component(s), user interface(s), processor component(s), data store(s), etc.) associated with the identification management component 300.

The identification management component 300 also can include the data store 318 that can store data structures (e.g., user data, metadata), instructions, procedures, and/or code structure(s) (e.g., modules, objects, hashes, classes) to facilitate performing or controlling operations associated with the identification management component 300. The data store 318 also can store information (e.g., information relating to content fingerprints (e.g., first content fingerprints, first reference content fingerprints, content identification information associated with the first reference content fingerprints, content identification information associated with second-tier content identifications, etc.) or other metadata associated with content (e.g., as stored in the reference database 320), information relating to a defined matching criterion(s), information relating to a defined fingerprint algorithm (e.g., first fingerprint algorithm), information relating to other operations of the identification management component 300, etc.). The identification management component 300 can retrieve desired (e.g., applicable) information from the data store 318 to matching content fingerprints (e.g., first content fingerprints) with each other or with a first reference content fingerprint, grouping users associated with respective content being presented on their communication devices, identifying content associated with a group of users, and/or performing or controlling other operations associated with the identification management component 300. The processor component 316 can be coupled (e.g., through a memory bus) to the data store 318 in order to store and retrieve information desired to operate and/or confer functionality, at least in part, to the components (e.g., communicator component 302, aggregator component 304, analyzer component 306, etc.) of the identification management component 300, and/or substantially any other operational aspects of the identification management component 300.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 4:
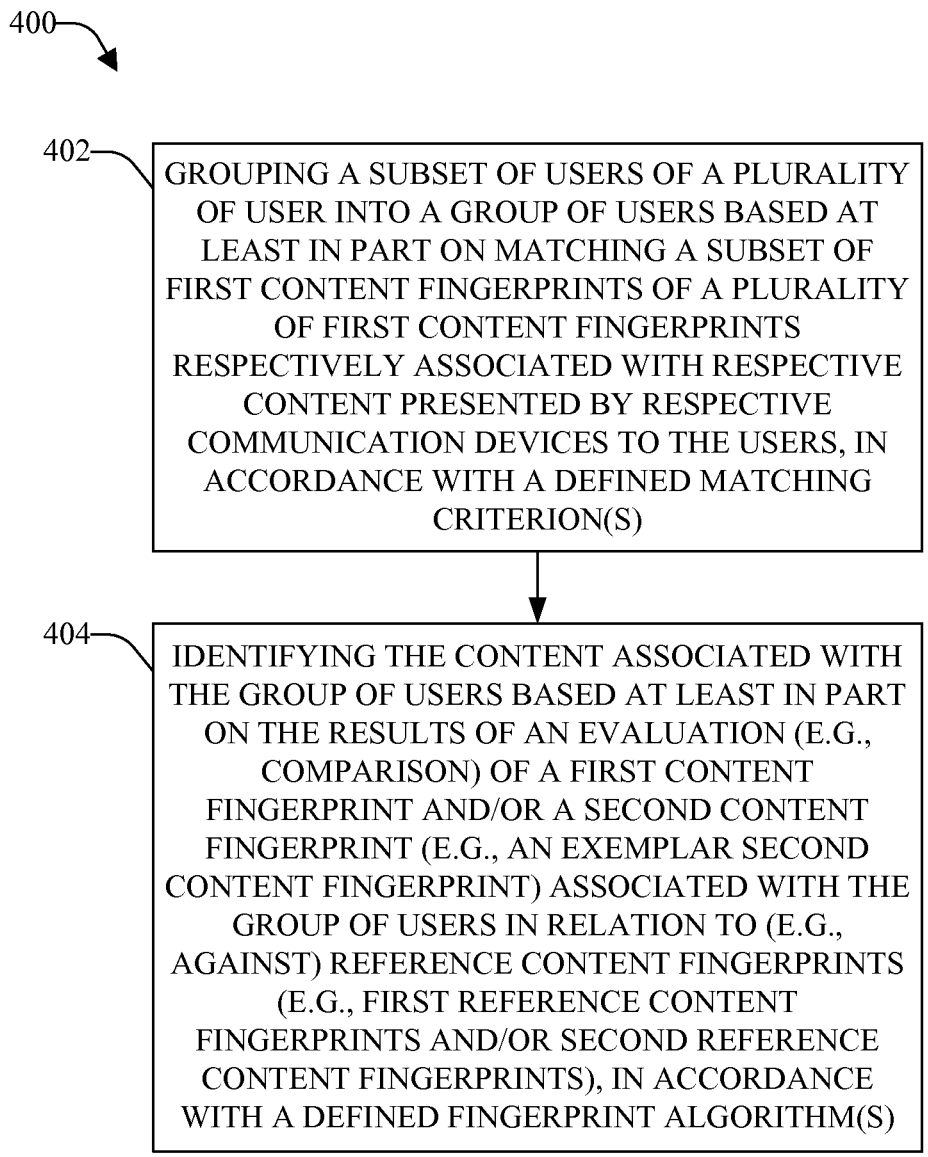
FIG. 4 depicts a flow chart of an example method that can use content fingerprints to facilitate identifying content presented by communication devices associated with respective users, in accordance with various aspects and implementations described herein.
Figure 5:
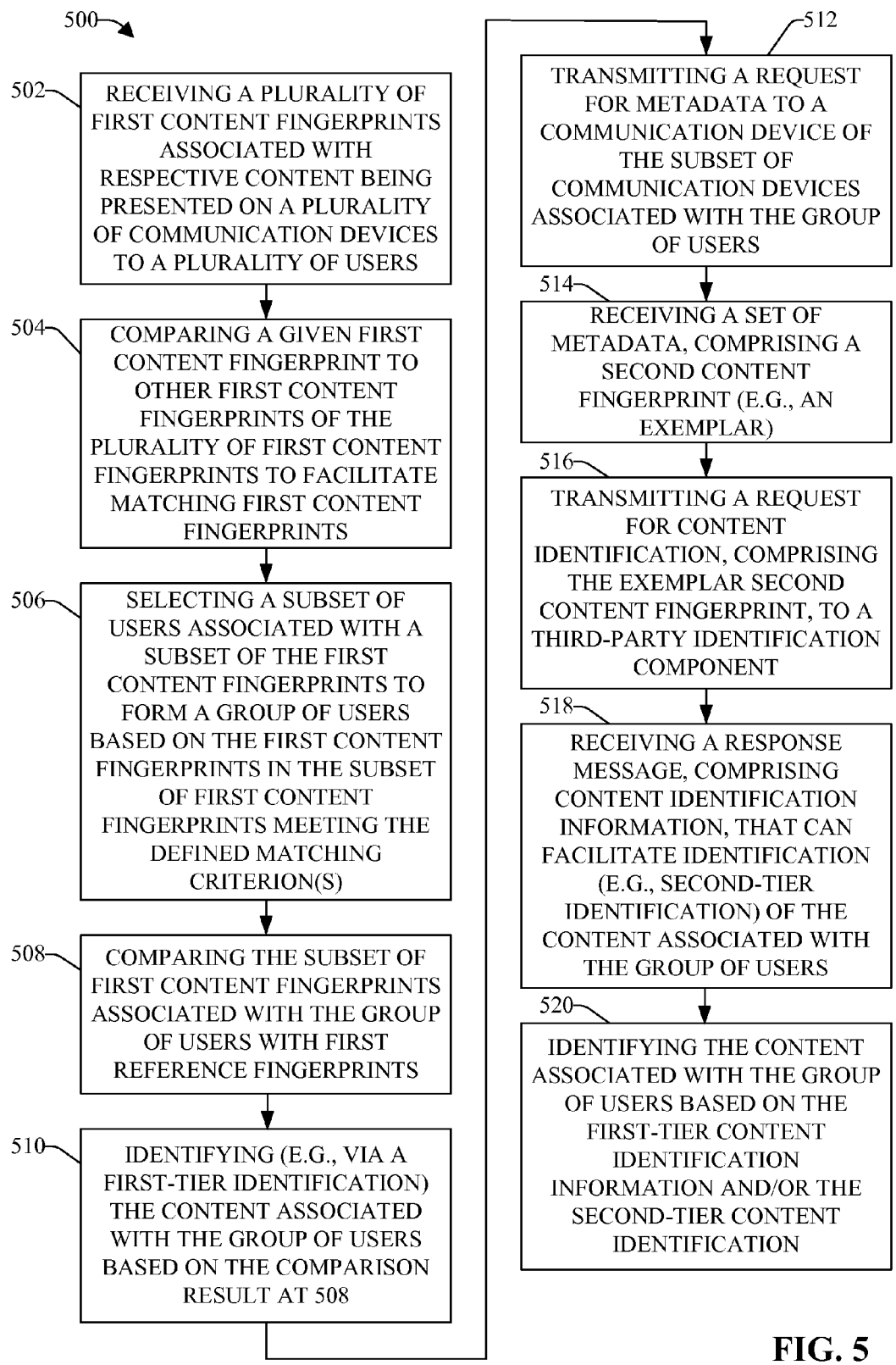
FIG. 5 depicts a flow chart of another example method that can use content fingerprints to facilitate identifying content presented by communication devices associated with respective users, in accordance with various aspects and implementations described herein.
Figure 6:
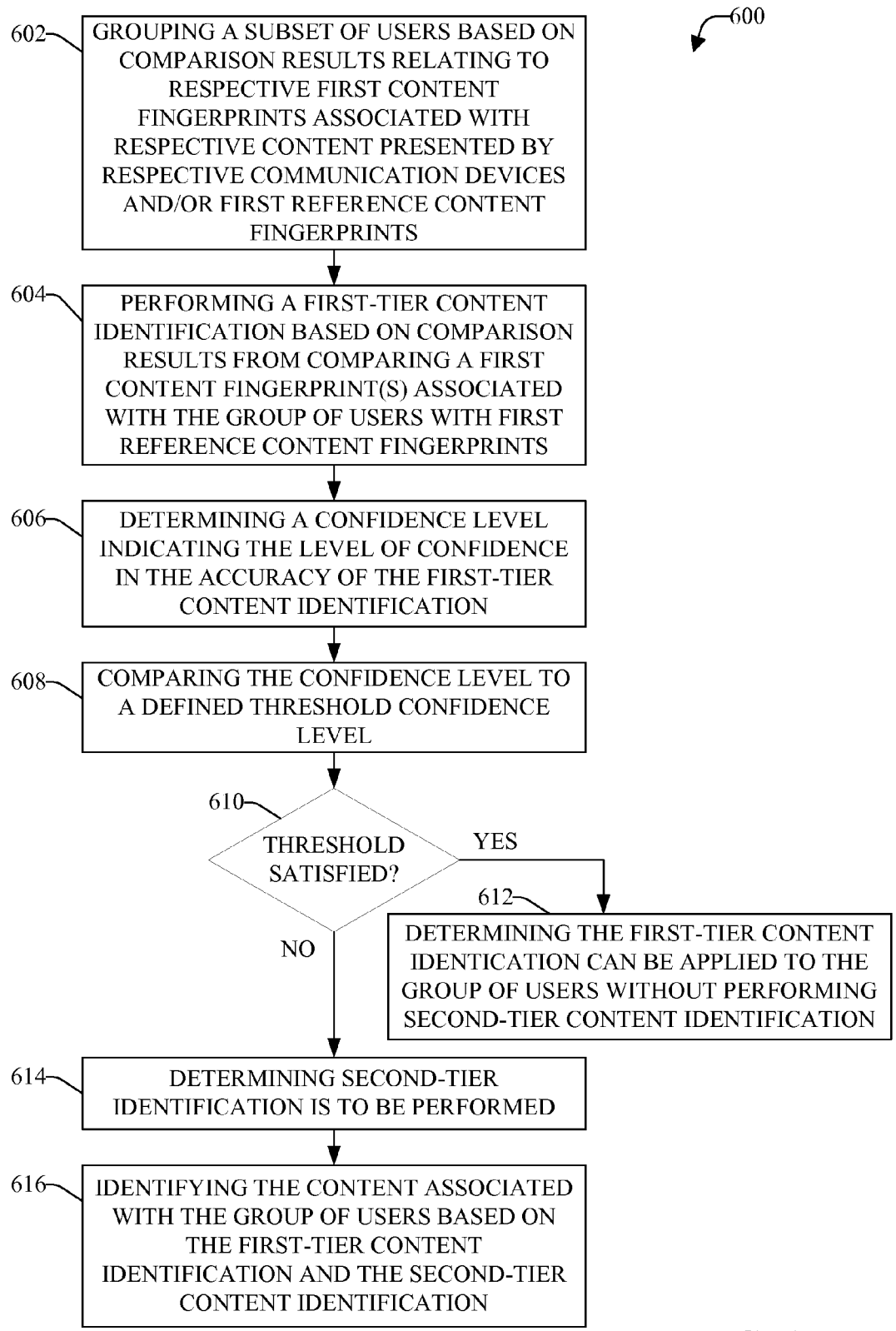
FIG. 6 illustrates a flow chart of still another example method that can use content fingerprints to facilitate identifying content presented by communication devices associated with respective users, in accordance with various aspects and implementations described herein.

In view of the example systems, components, and devices described above, example methods that can be implemented in accordance with this disclosure can be further appreciated with reference to flowcharts in FIGS. 4-6. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

With reference to FIG. 4, illustrated is a flow chart of an example method 400 that can use content fingerprints to facilitate identifying content presented by communication devices associated with respective users, in accordance with various aspects and implementations described herein. The method 400 can be used, for example, by an identification management component.

At 402, a subset of users of a plurality of users can be grouped into a group of users based at least in part on matching a subset of first content fingerprints of a plurality of first content fingerprints respectively associated with respective content presented by respective communication devices to the users, in accordance with a defined matching criterion(s). The identification management component can analyze or evaluate first content fingerprints that can be representative of or correspond to content being presented by the plurality of communication devices to respective users. The identification management component can analyze or evaluate (e.g., compare) the first content fingerprints in relation to (e.g., against) each other and/or can evaluate the first content fingerprints against first reference content fingerprints to facilitate grouping a subset of users (and associated communication devices) together that are determined to be perceiving the same content (e.g., same movie, same video, same TV show, etc.) via respective communication devices. The identification management component can determine or match a subset of users of the plurality of users that are perceiving (e.g., viewing) the same content, or at least potentially are perceiving the same content, on their respective communication devices, based at least in part the analysis or evaluation of the first content fingerprints respectively associated with the content presented to the respective users, and can group the subset of users together. The first reference content fingerprints can be respectively associated with identification information that can facilitate identifying content and/or grouping users into a group of users. The identification management component can maintain the first reference content fingerprints in a reference database that can be stored in a data store.

At 404, the content associated with the group of users can be identified based at least in part on the results of an evaluation (e.g., comparison) of a first content fingerprint (e.g., an exemplar first content fingerprint) and/or a second content fingerprint (e.g., an exemplar second content fingerprint) associated with the group of users in relation to (e.g., against) reference content fingerprints (e.g., first reference content fingerprints and/or second reference content fingerprints), in accordance with a defined fingerprint algorithm(s) (e.g., a first fingerprint algorithm and/or a second fingerprint algorithm). The identification management component can determine or identify a first content fingerprint (or more than one first content fingerprint, if desired) from the subset of fingerprints associated with the subset of users in the group of users and can select that first content fingerprint to be an exemplar first content fingerprint for the group of users to facilitate identifying the content for the group (e.g., based at least in part on the exemplar first content fingerprint) and/or obtaining an exemplar second content fingerprint. In some implementations, the identification management component can aggregate information, for example, relating to characteristic components, of the first content fingerprints to facilitate generating an exemplar first content fingerprint that can be associated with the group of users.

In certain implementations, the identification management component can transmit a request for metadata, including a second content fingerprint, to a communication device associated with the exemplar first content fingerprint. The communication device can generate the second content fingerprint and/or identify other metadata, and can transmit the metadata to the identification management component. The identification management component can use the second content fingerprint received from the communication device as an exemplar, and can include it in a content identification request that the identification management component can send to a third-party identification component. The third-party identification component can facilitate identifying the content associated with the exemplar second content fingerprint and generating identification information that identifies the content based at least in part on an evaluation of the exemplar second content fingerprint in relation to second reference content fingerprints, as more fully disclosed herein, and can send the identification information to the identification management component for further processing (e.g., further evaluation).

The identification management component can facilitate identifying the content associated with a group of users, based at least in part on the results of evaluating the exemplar first content fingerprint associated with (e.g., selected to be representative of) the group of users, and/or the identification information associated with the exemplar second content fingerprint, which can facilitate identifying the content, that can be received from a third-party identification component. The identification management component can propagate identification of the content that was made based on the exemplar first and/or second content fingerprints in connection with the communication device and associated user in the group of users to the other communication devices and other associated users in the group of users.

Referring to FIG. 5, depicted is a flow chart of another example method 500 that can use content fingerprints to facilitate identifying content presented by communication devices associated with respective users, in accordance with various aspects and implementations described herein. The method 500 can be used, for example, by an identification management component.

At 502, a plurality of first content fingerprints associated with respective content being presented on a plurality of communication devices to a plurality of users can be received. The identification management component can receive the plurality of first content fingerprints from the respective communication devices, for example, in response to a request for a first content fingerprint that the identification management component sent to the plurality of communication devices.

At 504, a given first content fingerprint of the plurality of first content fingerprints can be compared to other first content fingerprints of the plurality of first content fingerprints to facilitate matching first content fingerprints. The identification management component can compare the given first content fingerprint to the other first content fingerprints of the plurality of first content fingerprints (e.g., the first content fingerprints can be cross-checked against each other to facilitate matching first content fingerprints and forming a group of users comprising users associated with matching first content fingerprints). For instance, the identification management component can compare the respective characteristic components of the given first content fingerprint to the respective characteristic components of the other first content fingerprints of the plurality of first content fingerprints to facilitate identifying first content fingerprints that have a set of characteristic components in common (e.g., matched) with the given first content fingerprint that satisfies a defined matching criterion(s) (e.g., satisfies a defined characteristic-component matching threshold value or score, in accordance with the defined matching criterion(s)). In some implementations, a first content fingerprint can be a match with the given first content fingerprint (and/or a first reference content fingerprint) even if the first content fingerprint does not identically match the given first content fingerprint (and/or a first reference content fingerprint), in accordance with the defined matching criterion(s).

At 506, a subset of users (and a group of associated communication devices) associated with a subset of the first content fingerprints can be selected to form a group of users based at least in part on the first content fingerprints in the subset of first content fingerprints meeting the defined matching criterion(s). The identification management component can determine or identify one or more of the other first content fingerprints that sufficiently match the given first content fingerprint, in accordance with the defined matching criterion(s), and can form the subset of first content fingerprints comprising the given first content fingerprint and the one or more other first content fingerprints that sufficiently match the given first content fingerprint. The identification management component can determine or identify respective users that are associated with the first content fingerprints in the subset of first content fingerprints and can form a group of users comprising users that are associated with the subset of the first content fingerprints.

At 508, the subset of first content fingerprints associated with the group of users can be compared with first reference fingerprints respectively associated with known content to facilitate identifying the content associated with the group, in accordance with a defined matching criterion(s). The identification management component can compare all or a desired portion of the first content fingerprints of the subset of first content fingerprints with the set of first reference fingerprints to facilitate matching the first content fingerprints (e.g., one or more of the first content fingerprints) with one of the first reference content fingerprints to facilitate identifying the content associated with the group of users. In some implementations, during the user grouping process, the identification management component can aggregate information from multiple first content fingerprints of the group of first content fingerprints to facilitate matching the first content fingerprints against a first reference content fingerprint and identifying the content associated with the first content fingerprints.

In some implementations, the operations associated with reference numeral 504 and 506 can be modified to (at 504) compare the first content fingerprints of the plurality of first content fingerprints with the first reference content fingerprints to facilitate matching a subset of first content fingerprints with a first reference content fingerprint, and (at 506) select a subset of users (and a group of associated communication devices) associated with the subset of first content fingerprints to form the group of users based at least in part on the first content fingerprints in the subset of first content fingerprints satisfying the defined matching criterion(s).

At 510, the content associated with the group of users can be identified (or at least a preliminary or first-tier identification of the content can be made) based at least in part on the results of the comparison of the subset of first content fingerprints with the first reference fingerprints. The identification management component can identify the content associated with the group of users (e.g., the content being presented by the communication devices to the users in the group of users) based at least in part on identification information associated with the first reference content fingerprint that matches (e.g., best matches, relative to the other first reference content fingerprints) with the first content fingerprints of the subset of first content fingerprints. The identification management component can employ a first fingerprint algorithm to facilitate matching first content fingerprints with each other, grouping users associated with first content fingerprints, matching the subset of first content fingerprints against first reference content fingerprints, and/or identifying the content associated with the group of users.

At 512, a request for metadata can be transmitted to a communication device of the subset of communication devices associated with the group of users. The identification management component can generate the request for metadata and can send the request to a desired communication device of the subset of communication devices associated with the group of users. For example, the identification management component can determine or identify the first content fingerprint of the subset of first content fingerprints that suitably (e.g., most suitably) represents the subset of first content fingerprints and associated group of users, in accordance with the defined matching criterion(s), and can select that first content fingerprint determined or identified to be suitable. The identification management component can send the request for metadata to the communication device of the subset of communication devices that is associated with the first content fingerprint determined or identified to be suitable.

At 514, a set of metadata, comprising a second content fingerprint associated with content presented by the communication device, can be received, for example, from the communication device. The identification management component can receive the set of metadata from the communication device to which the request for metadata was sent. The identification management component can use the second content fingerprint as an exemplar second content fingerprint to represent the group of users to facilitate identification of the content associated with the group of users by a third-party identification component that provides third-party content identification services.

At 516, a request for content identification, comprising the exemplar second content fingerprint can be transmitted to a third-party identification component. The identification management component can send the request for content identification to the third-party identification component.

At 518, in response to the request for content identification, a response message, comprising content identification information that can facilitate identification (e.g., second-tier content identification) of the content associated with the group of users, can be received. The identification management component can receive the response message from the third-party identification component. The content identification information can comprise, for example, an identification of the content that was determined by the third-party identification component based at least in part on a comparison of the exemplar second content fingerprint with second reference content fingerprints respectively associated with known content, in accordance with a defined matching criterion(s) and a second fingerprint algorithm. The third-party identification component can maintain the second reference content fingerprints and respectively associated content identification information in a reference database that can be stored in a data store of or associated with the third-party identification component.

At 520, the content associated with the group of users can be identified based at least in part on the content identification information received from the third-party identification component with regard to the second-tier content identification and/or the content identification rendered by the identity management component with regard to the first-tier content identification. The identification management component can analyze the content identification information associated with the second-tier content identification and the content identification information associated with the first-tier content identification with regard to the group of users, and can determine or identify the content associated with the group of users based at least in part on the results of the analysis, in accordance with a defined matching or content identification criterion(s).

The content identification was based in part on an exemplar second content fingerprint for content presented by one communication device to a user in the group of users. The identification management component can propagate the content identification based on the exemplar second content fingerprint to other users in the group of users to determine that the other users in the group of users are/were being presented the same content via their respective communication devices as the content from which the exemplar second content fingerprint was generated. By propagating the content identification to the other users in the group of users, the identification management component can reduce the number of content identification requests it makes to the third-party identification component, and can thereby the costs (e.g., financial costs relating to the requests, resource costs associated with the requests, etc.) associated with using the third-party identification services of the third-party identification component.

FIG. 6 illustrates a flow chart of still another example method 600 that can use content fingerprints to facilitate identifying content presented by communication devices associated with respective users, in accordance with various aspects and implementations described herein. The method 600 can be used, for example, by an identification management component.

At 602, a subset of users of a plurality of users associated with a plurality of communication devices presenting content to the users can be grouped based at least in part on comparison results relating to respective first content fingerprints associated with the respective content presented by the respective communication devices and/or first reference content fingerprints. The identification management component can determine or identify the group of users based at least in part on comparing respective first content fingerprints to each other (e.g., to a given first content fingerprint associated with a communication device of the subset of communication devices) and/or with first reference content fingerprints, as more fully disclosed herein.

At 604, a first-tier content identification can be performed to facilitate identifying content associated with the group of users based at least in part on comparison results from comparing one or more of the first content fingerprints associated with the group of users with the first reference content fingerprints. The identification management component, which can comprise the content identification component, can perform a first-tier content identification of the content associated with the group of users. The identification management component can facilitate identifying or determining the content associated with the group of users based at least in part on comparison results from comparing the one or more of the first content fingerprints associated with the group of users with the first reference content fingerprints, as more fully disclosed herein.

At 606, a confidence level that can indicate the level of confidence in the accuracy of the first-tier content identification can be determined based at least in part on a defined matching criterion(s). The identification management component can determine a confidence level (e.g., an overall confidence level or score), based at least in part on a defined matching criterion(s), which can comprise matching criterion(s) and/or content identification criterion(s), as more fully disclosed herein.

At 608, the confidence level associated with the first-tier content identification can be compared to a defined threshold confidence level. The identification management component (e.g., using a content identification component) can compare the confidence level (e.g., the overall confidence level) with the defined threshold confidence level. The defined threshold confidence level can indicate whether the first-tier content identification is sufficiently accurate to allow the second-tier content identification to be bypassed.

At 610, a determination can be made regarding whether the confidence level associated with the first-tier content identification satisfies the defined threshold confidence level. The identification management component can determine whether the confidence level associated with the first-tier content identification satisfies (e.g., is at or above) the defined threshold confidence level.

If, at 610, it is determined that the confidence level associated with the first-tier content identification satisfies the defined threshold confidence level, at 612, it can be determined that the content identification determined during the first-tier content identification can be applied to the group of users, and the second-tier content identification can be bypassed. If the identification management component determines that the confidence level associated with the first-tier content identification satisfies the defined threshold confidence level, the identification management component can determine that the content identification determined during the first-tier content identification can be applied to the group of users, and the second-tier content identification can be bypassed.

If, at 610, it is determined that the confidence level associated with the first-tier content identification does not satisfy the defined threshold confidence level, at 614, it can be determined that a second-tier content identification is to be performed. If the identification management component determines that the confidence level associated with the first-tier content identification does not satisfy (e.g., is below) the defined threshold confidence level, the identification management component can determine that the confidence in the accuracy of the first-tier content identification is not high enough to apply to the group of users without performing a second-tier content identification, and that the second-tier content identification is to be performed.

At 616, the content associated with the group of users can be identified based at least in part on the first-tier content identification and the second-tier identification. As part of the second-tier content identification, identification of the content associated with the group of users can be facilitated based at least in part on content identification information received from a third-party identification component, wherein the content identification information can be derived (e.g., determined or generated) based at least in part on comparison results relating to a second content fingerprint associated with the group of users and second reference content fingerprints associated with the third-party identification component. To facilitate the second-tier content identification, the identification management component can obtain metadata, comprising the second content fingerprint (e.g., exemplar second content fingerprint) from a communication device associated with the group of users. The identification management component can send a request for content identification, comprising the second content fingerprint, to the third-party identification component.

The third-party identification component can facilitate identifying the content associated with the second content fingerprint and generate the content identification information relating thereto based at least in part on the results of comparing the second content fingerprint with second reference content fingerprints respectively associated with known content (e.g., content known to the third-party identification component), in accordance with a defined matching criterion(s) and a second fingerprint algorithm. The third-party identification component can send a response message comprising the content identification information to the identification management component.

The identification management component can receive the response message from the third-party identification component. The identification management component can analyze the content identification information associated with the second-tier content identification and the content identification information associated with the first-tier content identification with regard to the group of users, and can determine or identify the content associated with the group of users based at least in part on the results of the analysis, in accordance with a defined matching or content identification criterion(s). The identification management component can propagate the content identification based on the exemplar second content fingerprint to other users in the group of users to determine that the other users in the group of users are/were being presented the same content via their respective communication devices as the content from which the exemplar second content fingerprint was generated.

Figure 7:
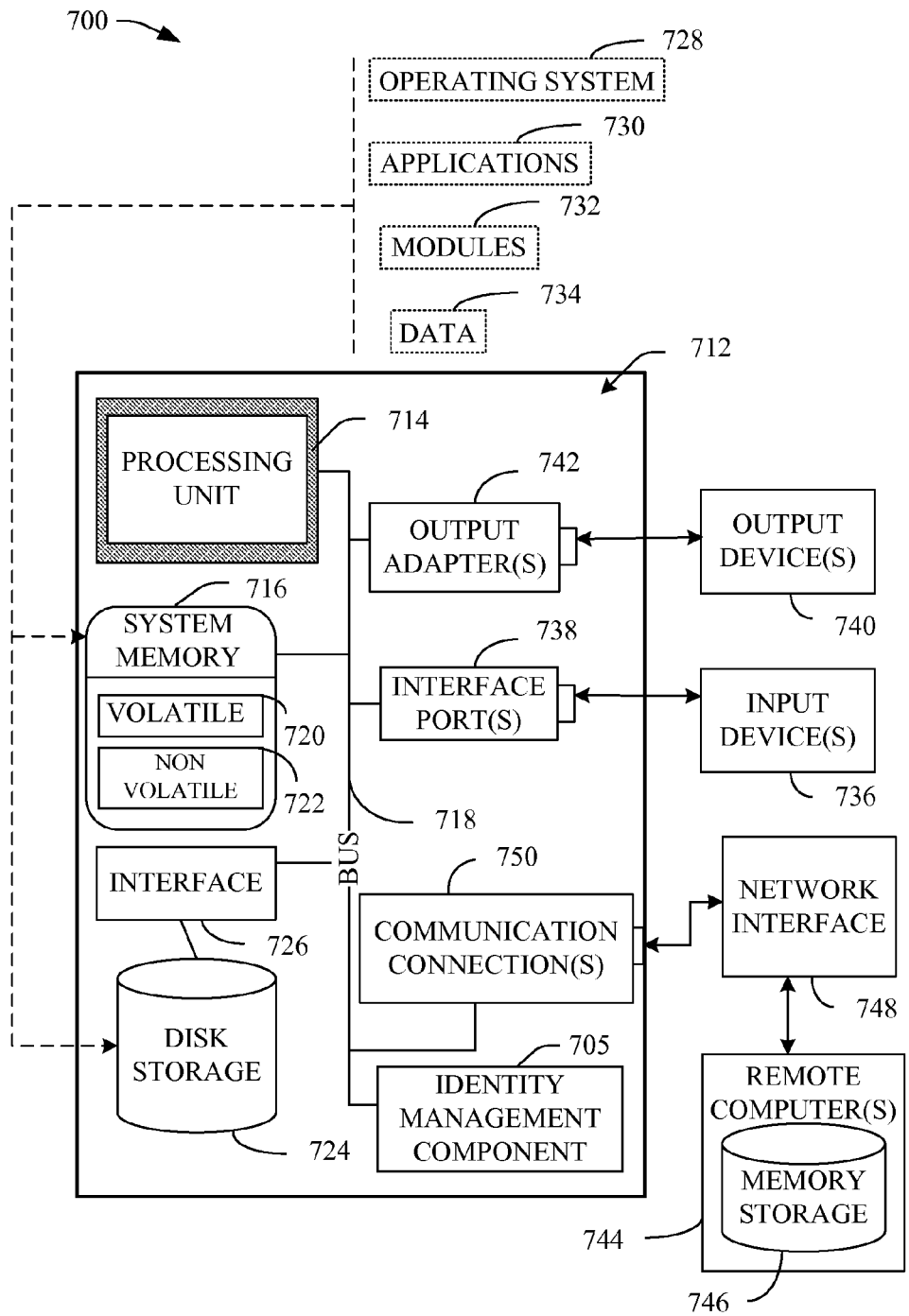
FIG. 7 is a schematic block diagram illustrating a suitable operating environment.
Figure 8:
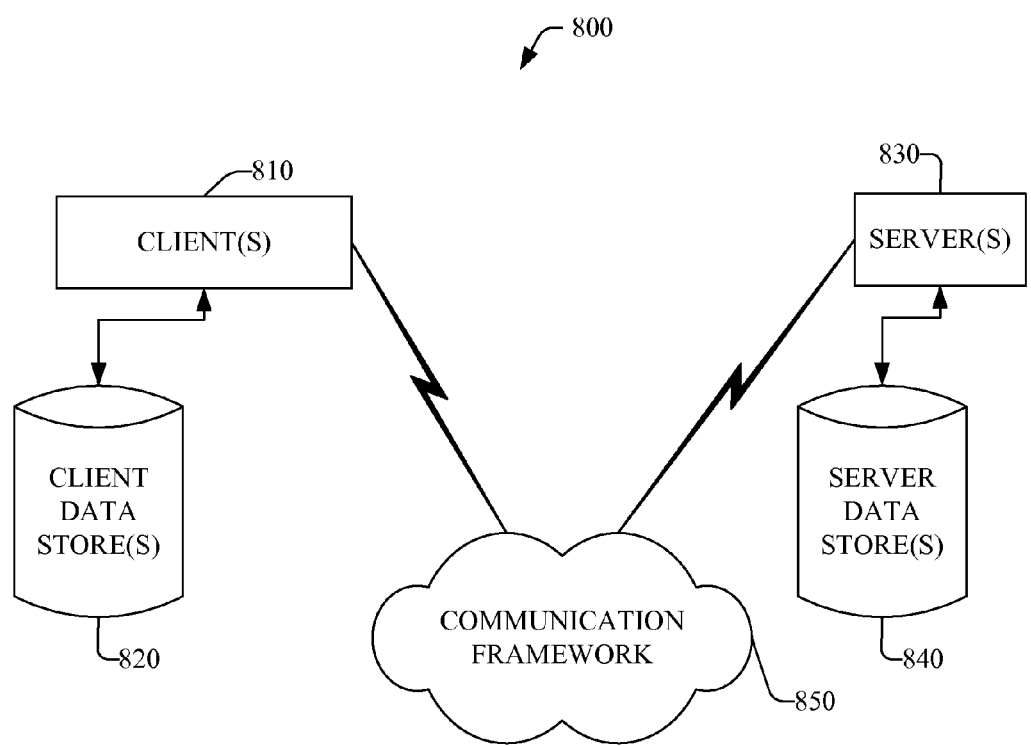
FIG. 8 is a schematic block diagram of a sample-computing environment.

In order to provide a context for the various aspects of the disclosed subject matter, FIGS. 7 and 8 as well as the following discussion are intended to provide a brief, general description of a suitable environment in which the various aspects of the disclosed subject matter may be implemented. With reference to FIG. 8, a suitable operating environment 700 for implementing various aspects of this disclosure includes a computer 712. The computer 712 includes a processing unit 714, a system memory 716, and a system bus 718. It is to be appreciated that the computer 712 can be used in connection with implementing one or more of the systems or components shown and described in connection with FIGS. 1-3. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 712 also includes removable/non-removable, volatile/non-volatile computer storage media. FIG. 7 illustrates, for example, a disk storage 724. Disk storage 724 includes, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used, such as interface 726.

FIG. 7 also depicts software that acts as an intermediary between users and the basic computer resources described in the suitable operating environment 700. Such software includes, for example, an operating system 728. Operating system 728, which can be stored on disk storage 724, acts to control and allocate resources of the computer 712. System applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

In accordance with various aspects and implementations, the computer 712 can be used to analyze content (e.g., video content, audio content, etc.), analyze content fingerprints (e.g., first content fingerprints, second content fingerprints, first or second reference content fingerprints, etc.), group users (and associated communication devices) into a group, identify content associated with a group, generate confidence levels or scores, determine whether to perform second-tier content identification in relation to a group of users, etc., as more fully disclosed herein. In some implementations, the computer 712 can include a plurality of processors that can be used to process data and perform computing tasks (e.g., tasks relating to grouping users, tasks relating to identifying content, etc.), as more fully disclosed herein. In certain exemplary embodiments, the computer 712 can include an identification management component 705 (as depicted) that can function as more fully disclosed herein to facilitate analyzing content fingerprints, grouping users (and associated communication devices) into a group, identifying content associated with a group, generating confidence levels or scores, determining whether to perform second-tier content identification in relation to a group of users, and/or performing other operations associated with the identification management component 705, as disclosed herein.

FIG. 8 is a schematic block diagram of a sample-computing environment 800 with which the subject matter of this disclosure can interact. The sample-computing environment 800 includes one or more client(s) 810. The client(s) 810 can be hardware and/or software (e.g., threads, processes, computing devices). The sample-computing environment 800 also includes one or more server(s) 830. Thus, sample-computing environment 800 can correspond to a two-tier client server model or a multi-tier model (e.g., client, middle tier server, data server), amongst other models. The server(s) 830 can also be hardware and/or software (e.g., threads, processes, computing devices). The servers 830 can house threads to perform transformations by employing this disclosure, for example. One possible communication between a client 810 and a server 830 may be in the form of a data packet transmitted between two or more computer processes.

The sample-computing environment 800 includes a communication framework 850 that can be employed to facilitate communications between the client(s) 810 and the server(s) 830. The client(s) 810 are operatively connected to one or more client data store(s) 820 that can be employed to store information local to the client(s) 810. Similarly, the server(s) 830 are operatively connected to one or more server data store(s) 840 that can be employed to store information local to the servers 830.

It is to be appreciated and understood that components (e.g., communication device, communication network, identification management component, grouper component, content identification component, reference database, data store, third-party identification component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone, electronic tablet, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "engine," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
at least one memory that stores computer executable components; and
at least one processor that executes the following computer executable components stored in the at least one memory:
a grouper component that groups a subset of users of a plurality of users into a group of users based in part on a determination that respective content fingerprints associated with respective users of the subset of users meet a defined matching criterion for grouping users, wherein the respective content fingerprints are associated with respective content presented by communication devices to the respective users of the subset of users; and
a content identification component that identifies content presented by a communication device to a user in the group of users, based in part on a comparison of a content fingerprint with a set of reference content fingerprints, and propagates the identification of the content presented by the communication device to the user to other users in the group of users to facilitate identification of the respective content presented to the other users in the group of users.

2. The system of claim 1, wherein the grouper component receives the content fingerprints respectively associated with the plurality of users, analyzes the content fingerprints respectively associated with the plurality of users, and determines that the respective users are to be included in the group of users in response to a result of an analysis of the content fingerprints indicating the respective content fingerprints associated with the respective users meet the defined matching criterion, and wherein the content fingerprints are first-tier content fingerprints.

3. The system of claim 2, wherein the content identification component generates a metadata request that requests metadata comprising an exemplar second-tier content fingerprint from the communication device, wherein the exemplar second-tier content fingerprint is associated with the group of users.

4. The system of claim 3, wherein, in response to the metadata request, the content identification component receives information, comprising the metadata that facilitates identification of the content being presented by the communication device to the user in the group of users, from the communication device.

5. The system of claim 3, wherein the content identification component generates a content identification request and transmits the content identification request to a third-party identification component, wherein the content identification request includes the exemplar second-tier content fingerprint to facilitate the identification of the content being presented by the communication device to the user and the propagation of the identification of the content to the other users in the group of users.

6. The system of claim 5, wherein the content identification component receives, from the third-party identification component, content identification information that facilitates the identification of the content being presented by the communication device to the user.

7. The system of claim 6, wherein the content identification information is based in part on a result from a comparison of the exemplar second-tier content fingerprint with a set of second-tier reference content fingerprints.

8. The system of claim 6, wherein the content identification component identifies the content being presented by the communication device to the user based in part on a result of an evaluation of the identification of the content associated with the first-tier content fingerprints and the identification of the content associated with the exemplar second-tier content fingerprint.

9. The system of claim 1, wherein the content identification component receives a plurality of first-tier content fingerprints and a plurality of second-tier content identifications from the communication devices, groups the subset of users based in part on at least one of a determination that respective first-tier content fingerprints associated with the respective users of the subset of users meet the defined matching criterion for grouping users or a grouping-related determination that is based in part on the plurality of second-tier content identifications.

10. The system of claim 9, wherein the content identification component identifies the content associated with the group of users based in part on at least one of a result of a comparison of respective first-tier content fingerprints associated with the respective users of the subset of users with first-tier reference content fingerprints or a subset of second-tier content identifications associated with the subset of users.

11. The system of claim 9, wherein respective second-tier content identifications of the plurality of second-tier content identifications are received by the communication devices from a third-party identification component in response to respective content identification requests sent by the communication devices to the third-party identification component.

12. The system of claim 1, wherein the grouper component utilizes at least one defined fingerprint algorithm to facilitate the grouping of the group of users, or the content identification component utilizes the at least one defined fingerprint algorithm to facilitate the identification of the content being presented by the communication device to the user and the propagation of the identification of the content to the other users in the group of users.

13. The system of claim 1, wherein the communication device includes at least one of a television, an Internet-protocol television, a mobile phone, a computer, a set-top box, a cable box, a content-streaming device, an electronic tablet, an electronic pad, an electronic notebook, an electronic reader, a personal digital assistant, an electronic gaming device, or an electronic device that includes information communication functionality.

14. A method, comprising:
employing at least one processor to facilitate execution of code instructions retained in at least one memory device, the at least one processor, in response to execution of the code instructions, performs operations comprising:
clustering users of a plurality of users to form a set of users in response to determining that respective content fingerprints associated with respective users in the set of users meet a defined matching criterion for clustering of users, wherein the respective content fingerprints are associated with respective content presented by communication devices to the respective users of the set of users;

identifying content presented by a communication device associated with a user in the set of users, based in part on a comparison of a content fingerprint with a set of reference content fingerprints; and propagating the identification of the content presented by the communication device to the user to other users in the set of users to facilitate identifying the respective content presented to the other users in the set of users.

15. The method of claim 14, further comprising:

receiving content fingerprints associated with the users of the plurality of users;

analyzing the content fingerprints associated with the users to generate analysis results; and determining that the respective users are to be included in the set of users in response to the analysis results indicating that the respective content fingerprints of the respective users meet the defined matching criterion, wherein the content fingerprints are first-tier content fingerprints.

16. The method of claim 15, further comprising:

identifying a first-tier content fingerprint associated with the communication device to represent the set of users based in part on the first-tier content fingerprints;

generating a metadata request that requests metadata comprising an exemplar second-tier content fingerprint from the communication device; and transmitting the metadata request to the communication device to facilitate obtaining the metadata comprising the exemplar second-tier content fingerprint from the communication device.

17. The method of claim 16, further comprising:

in response to the metadata request, receiving the metadata comprising the exemplar second-tier content fingerprint;

generating a content identification request that comprises the exemplar second-tier content fingerprint; and transmitting the content identification request to a third-party identification component to facilitate the identifying of the content presented by the communication device to the user.

18. The method of claim 17, further comprising:

in response to the content identification request, receiving content identification information from the third-party identification component, wherein the content identification information facilitates the identifying of the content presented by the communication device to the user.

19. The method of claim 18, further comprising:

evaluating an identification of the content associated with the first-tier content fingerprints and the content identification information associated with the exemplar second-tier content fingerprint to generate an evaluation result; and identifying the content being presented by the communication device to the user based in part on the evaluation result.

20. The method of claim 17, further comprising:

comparing the exemplar second-tier content fingerprint with a set of second-tier reference content fingerprints to generate a comparison results;

facilitating identifying the content presented by the communication device to the user based in part on the comparison result indicating that the exemplar second-tier content fingerprint and a second-tier reference content fingerprint of the set of second-tier reference content fingerprints meet the defined matching criterion;

identifying the content identification information associated with the second-tier reference content fingerprint; and transmitting a response message comprising the content identification information from the third-party identification component.

21. A non-transitory computer-readable medium comprising computer-executable instructions that, in response to execution, cause a system including a processor to perform operations, comprising:

clustering users to form a group of users from a plurality of users in response to determining that respective first-tier content fingerprints associated with respective users in the group of users meet a defined matching criterion for grouping of users, wherein the respective first-tier content fingerprints are associated with respective content presented by communication devices to the respective users of the group of users;

determining a first-tier identification of content presented by a communication device to a user in the group of users, in response to a comparison of a first-tier content fingerprint with a first-tier reference content fingerprint of a set of first-tier reference content fingerprints indicating that the first-tier content fingerprint and the first-tier reference content fingerprint are a match with each other in accordance with the defined matching criterion, wherein the first-tier reference content fingerprint is associated with first content identification information that facilitates the first-tier identification of content presented by the communication device to the user;

receiving, from an external identification service device, a second-tier identification of content presented by the communication device to the user, wherein the second-identification of content is based in part on a comparison of a second-tier content fingerprint with a second-tier reference content fingerprint of a set of second-tier reference content fingerprints indicating that the second-tier content fingerprint and the second-tier reference content fingerprint are a match with each other in accordance with the defined matching criterion, wherein the second-tier reference content fingerprint is associated with second content identification information that facilitates the second-tier identification of content presented by the communication device to the user;

identifying the content presented by the communication device to the user based in part on an evaluation of the first-tier identification of content and the second-tier identification of content; and applying the identification of the content presented by the communication device to the user to other users in the group of users to facilitate identifying the respective content presented to the other users in the group of users.

* * * * *